(12) United States Patent
Liddell et al.

(10) Patent No.: US 10,747,404 B2
(45) Date of Patent: Aug. 18, 2020

(54) TOUCHSCREEN INCLUDING TACTILE FEEDBACK STRUCTURES AND CORRESPONDING VIRTUAL USER INTERFACE ELEMENTS

(71) Applicant: Microchip Technology Incorporated, Chandler, AZ (US)

(72) Inventors: William J. Liddell, Petersfield (GB); Samuel Brunet, Fareham (GB)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 16/165,241

(22) Filed: Oct. 19, 2018

(65) Prior Publication Data
US 2019/0121435 A1   Apr. 25, 2019

Related U.S. Application Data

(60) Provisional application No. 62/576,383, filed on Oct. 24, 2017, provisional application No. 62/576,563, filed on Oct. 24, 2017.

(51) Int. Cl.
*G06F 3/048* (2013.01)
*G06F 3/0482* (2013.01)
(Continued)

(52) U.S. Cl.
CPC ............ *G06F 3/0482* (2013.01); *G06F 3/016* (2013.01); *G06F 3/03547* (2013.01);
(Continued)

(58) Field of Classification Search
CPC ......................................... G06F 3/0481–0489
See application file for complete search history.

(56) References Cited

U.S. PATENT DOCUMENTS 7,791,594 B2 * 9/2010 Dunko ................. G06F 1/1613
345/169
8,432,371 B2 * 4/2013 Hotelling .............. G06F 3/0412
345/173

(Continued)

FOREIGN PATENT DOCUMENTS

WO   2013/173624 A2   11/2013   ............ G06F 3/041

OTHER PUBLICATIONS

International Search Report and Written Opinion, Application No. PCT/US2018/057208, 14 pages, dated Jan. 29, 2019.

*Primary Examiner* — Steven B Theriault
(74) *Attorney, Agent, or Firm* — Slayden Grubert Beard PLLC

(57) ABSTRACT

A touch-sensitive touchscreen system may include a touchscreen cover layer, and a tactile structure formed in or coupled to the touchscreen cover layer and defining a non-planar surface texture (e.g., embodied as a ridge or other raised structure or a groove or other depression) that provides tactile feedback to a user's finger. In some embodiments, the tactile structure is formed from at least one material having a different dielectric constant than the touchscreen cover layer. A touchscreen display device arranged under the touchscreen cover may be configured to display a configurable graphical user interface (GUI) including a respective virtual user interface element at a location corresponding with the tactile structure. The system may include a processing unit configured to sense a touch at a location of a particular virtual user interface element, identify the particular virtual user interface element, and initiate an action associated with the virtual user interface element.

17 Claims, 19 Drawing Sheets

(51) Int. Cl.
*G06F 3/0488* (2013.01)
*G06F 3/0484* (2013.01)
*G06F 3/01* (2006.01)
*G06F 3/0354* (2013.01)

(52) U.S. Cl.
CPC ............ *G06F 3/048* (2013.01); *G06F 3/0484* (2013.01); *G06F 3/0488* (2013.01); *G06F 3/04847* (2013.01); *G06F 3/04883* (2013.01); *G06F 3/04886* (2013.01); *G06F 2203/04809* (2013.01)

(56) References Cited

U.S. PATENT DOCUMENTS

| | | | | |
|---|---|---|---|---|
| 8,456,438 B2* | 6/2013 | Ciesla | G06F 3/0202 | 345/156 |
| 8,547,339 B2* | 10/2013 | Ciesla | G06F 3/0202 | 345/156 |
| 8,553,005 B2* | 10/2013 | Ciesla | G06F 3/0202 | 345/156 |
| 8,587,541 B2* | 11/2013 | Ciesla | G06F 3/016 | 345/173 |
| 8,587,548 B2* | 11/2013 | Ciesla | G06F 3/0238 | 345/173 |
| 8,619,035 B2* | 12/2013 | Ciesla | G06F 3/016 | 340/407.2 |
| 8,717,151 B2* | 5/2014 | Forutanpour | G06F 3/04847 | 340/407.1 |
| 8,922,502 B2* | 12/2014 | Ciesla | G06F 3/0202 | 345/156 |
| 8,922,503 B2* | 12/2014 | Ciesla | G06F 3/0202 | 345/156 |
| 8,928,621 B2* | 1/2015 | Ciesla | G06F 3/0202 | 345/174 |
| 9,092,291 B1* | 7/2015 | Adib | G06F 8/61 | |
| 9,134,797 B2* | 9/2015 | Grant | G06F 3/016 | |
| 9,557,915 B2* | 1/2017 | Ciesla | G06F 3/016 | |
| 9,619,033 B2* | 4/2017 | Birnbaum | G06F 3/0414 | |
| 9,778,813 B2* | 10/2017 | Shenfield | G06F 3/0488 | |
| 10,206,044 B2* | 2/2019 | Melakari | H04R 7/045 | |
| 10,216,335 B1* | 2/2019 | Parekh | G06F 3/0418 | |
| 10,372,214 B1* | 8/2019 | Gleeson | G06F 3/0412 | |
| 10,386,940 B2* | 8/2019 | Kim | G06F 3/0362 | |
| 10,387,014 B2* | 8/2019 | Kim | G06F 3/04842 | |
| 10,416,799 B2* | 9/2019 | Picciotto | G06F 3/0414 | |
| 2006/0278444 A1* | 12/2006 | Binstead | G06F 3/044 | 178/18.06 |
| 2008/0150911 A1* | 6/2008 | Harrison | G06F 1/1626 | 345/173 |
| 2009/0115734 A1* | 5/2009 | Fredriksson | G06F 3/016 | 345/173 |
| 2009/0153519 A1* | 6/2009 | Suarez Rovere | G06F 3/0421 | 345/173 |
| 2009/0250267 A1* | 10/2009 | Heubel | G06F 3/041 | 178/18.03 |
| 2009/0315832 A1* | 12/2009 | Gray | G06F 3/04886 | 345/169 |
| 2009/0315836 A1* | 12/2009 | Pihlaja | G06F 3/04886 | 345/173 |
| 2010/0060568 A1* | 3/2010 | Fisher | G06F 3/03547 | 345/156 |
| 2010/0079264 A1* | 4/2010 | Hoellwarth | G06F 3/041 | 340/407.2 |
| 2010/0088532 A1* | 4/2010 | Pollock | G06F 1/1626 | 713/324 |
| 2010/0088632 A1* | 4/2010 | Knowles | G06F 3/0485 | 715/784 |
| 2010/0088639 A1* | 4/2010 | Yach | G06F 1/1626 | 715/825 |
| 2010/0088654 A1* | 4/2010 | Henhoeffer | G06F 3/04883 | 715/863 |
| 2010/0188371 A1* | 7/2010 | Lowles | G06F 3/0418 | 345/178 |
| 2011/0050587 A1* | 3/2011 | Natanzon | G06F 3/04842 | 345/173 |
| 2011/0057899 A1* | 3/2011 | Sleeman | G01L 1/146 | 345/174 |
| 2011/0115734 A1* | 5/2011 | Harashima | G06F 3/016 | 345/173 |
| 2012/0026124 A1* | 2/2012 | Li | G06F 3/0414 | 345/174 |
| 2012/0071149 A1* | 3/2012 | Bandyopadhyay | G06F 1/1643 | 455/418 |
| 2012/0105354 A1* | 5/2012 | Narasimhan | G06F 3/044 | 345/174 |
| 2012/0256862 A1* | 10/2012 | Wagner | G06F 3/048 | 345/173 |
| 2012/0268386 A1* | 10/2012 | Karamath | G06F 3/016 | 345/173 |
| 2012/0274596 A1* | 11/2012 | Ludwig | G06F 3/0412 | 345/173 |
| 2013/0093500 A1* | 4/2013 | Bruwer | H03K 17/955 | 327/517 |
| 2013/0215035 A1* | 8/2013 | Guard | G06F 3/0221 | 345/168 |
| 2013/0250491 A1* | 9/2013 | Alakontiola | G06F 3/044 | 361/679.01 |
| 2013/0326583 A1* | 12/2013 | Freihold | G06F 3/04815 | 726/3 |
| 2014/0028596 A1* | 1/2014 | Seo | G06F 3/0487 | 345/173 |
| 2014/0139450 A1* | 5/2014 | Levesque | G06F 3/016 | 345/173 |
| 2014/0176452 A1* | 6/2014 | Aleksov | G06F 3/0412 | 345/173 |
| 2014/0233774 A1* | 8/2014 | Kim | H04R 25/30 | 381/315 |
| 2014/0240253 A1* | 8/2014 | Choi | G06F 3/041 | 345/173 |
| 2014/0340609 A1* | 11/2014 | Taylor | H05B 33/04 | 349/58 |
| 2014/0349628 A1* | 11/2014 | Koh | H04M 1/72583 | 455/416 |
| 2014/0354587 A1* | 12/2014 | Mohindra | G06F 3/044 | 345/174 |
| 2015/0109214 A1* | 4/2015 | Shi | G06F 3/0416 | 345/173 |
| 2015/0109243 A1* | 4/2015 | Jun | G06F 3/044 | |
| 2015/0177877 A1* | 6/2015 | Hisatsugu | G06F 3/0416 | 345/174 |
| 2015/0185946 A1* | 7/2015 | Fourie | G06F 3/0416 | 345/174 |
| 2015/0228217 A1* | 8/2015 | Perdices-Gonzalez | G09G 3/348 | 345/5 |
| 2015/0286334 A1* | 10/2015 | Simmons | G06F 3/0416 | 345/174 |
| 2015/0355710 A1* | 12/2015 | Modarres | G09G 5/003 | 345/173 |
| 2016/0004309 A1* | 1/2016 | Modarres | G06F 3/0414 | 345/173 |
| 2016/0018891 A1* | 1/2016 | Levesque | G06F 3/016 | 345/174 |
| 2016/0328065 A1* | 11/2016 | Johnson | G06F 3/03545 | |
| 2016/0335468 A1* | 11/2016 | Long | G06K 9/0053 | |
| 2016/0357296 A1* | 12/2016 | Picciotto | G06F 3/0416 | |
| 2017/0060316 A1* | 3/2017 | Larson | G06F 3/0488 | |
| 2017/0075465 A1* | 3/2017 | Pedder | G06F 3/0414 | |
| 2017/0116884 A1* | 4/2017 | Choi | G06F 3/016 | |
| 2017/0168602 A1* | 6/2017 | Ye | G06F 3/044 | |
| 2017/0178470 A1* | 6/2017 | Khoshkava | H04M 1/0268 | |
| 2017/0256144 A1* | 9/2017 | Khoshkava | G08B 6/00 | |
| 2017/0301288 A1* | 10/2017 | Perdices-Gonzalez | G09G 3/3225 | |
| 2017/0309215 A1* | 10/2017 | Perdices-Gonzalez | G09G 3/3208 | |
| 2017/0336891 A1* | 11/2017 | Rosenberg | G06F 3/0421 | |
| 2017/0336901 A1* | 11/2017 | Mathew | B64D 43/00 | |

(56) References Cited

U.S. PATENT DOCUMENTS

| | | | |
|---|---|---|---|
| 2018/0025200 A1* | 1/2018 | Frye | G06K 9/0004 |
| | | | 257/9 |
| 2018/0039372 A1* | 2/2018 | Cho | G06F 3/0412 |
| 2018/0039392 A1* | 2/2018 | Kim | G06F 3/0414 |
| 2018/0074676 A1* | 3/2018 | Lee | G06F 3/0488 |
| 2018/0196568 A1* | 7/2018 | McCalley | G06F 3/0414 |
| 2018/0275757 A1* | 9/2018 | Cruz-Hernandez | G06F 3/016 |
| 2018/0275763 A1* | 9/2018 | Kim | G06F 1/1652 |
| 2018/0284892 A1* | 10/2018 | Kwon | G06F 3/04883 |

* cited by examiner

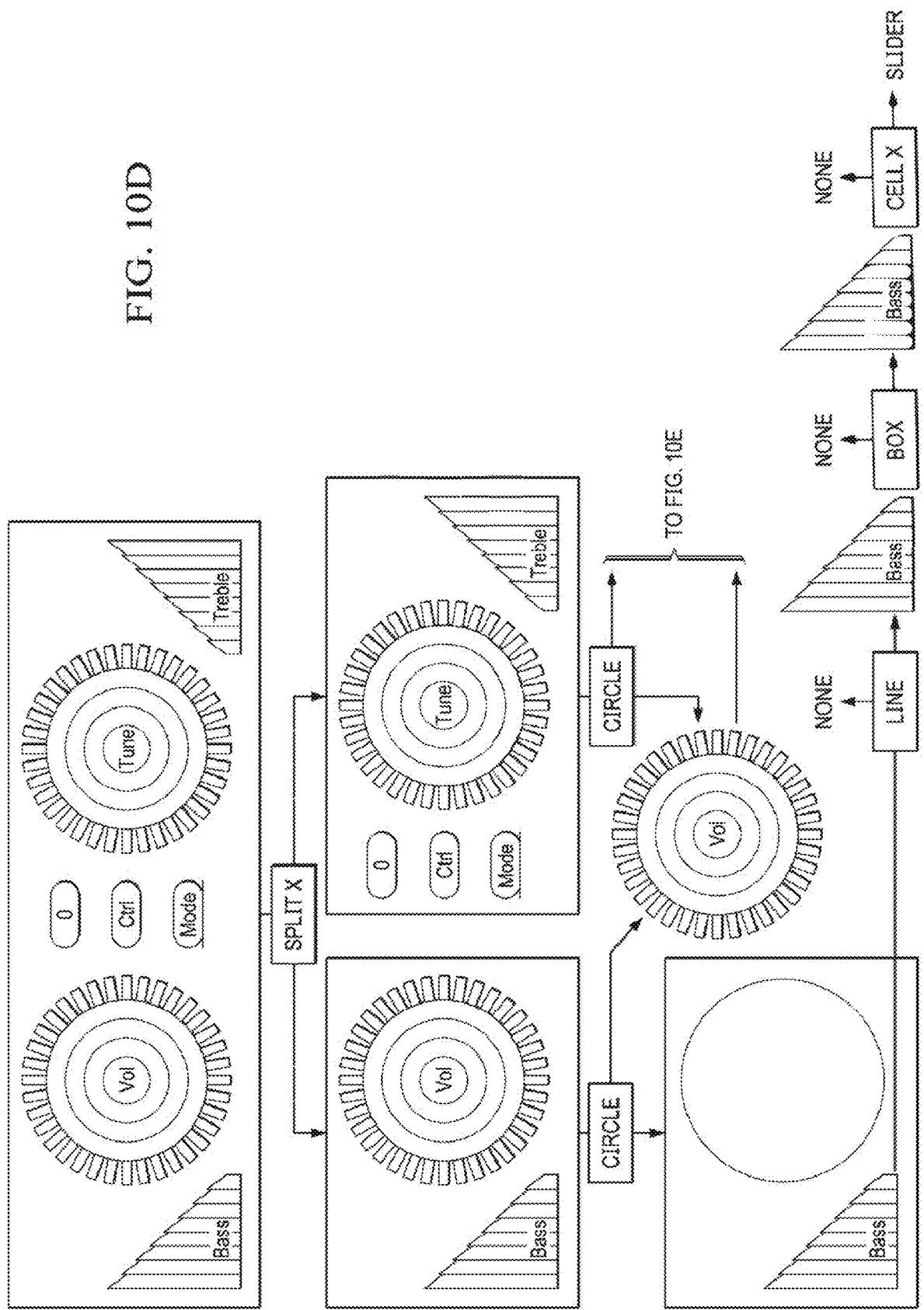

TOUCHSCREEN INCLUDING TACTILE FEEDBACK STRUCTURES AND CORRESPONDING VIRTUAL USER INTERFACE ELEMENTS

RELATED APPLICATIONS

This application claims priority to (a) U.S. Provisional Patent Application No. 62/576,383 filed Oct. 24, 2017, and (b) U.S. Provisional Patent Application No. 62/576,563 filed Oct. 24, 2017, the entire contents of which applications are hereby incorporated by reference for all purposes.

TECHNICAL FIELD

The present disclosure relates to touch-sensitive user interfaces, e.g., touchscreens, and more particular, to a touchscreen including tactile feedback structures (e.g., physical ridges or grooves) and corresponding virtual user interface elements, e.g., widgets.

BACKGROUND

Touch interfaces that incorporate touch sensing are used for a variety of applications, including for example in tablet computers, personal computers, smart phones, and other consumer products. They are also used as control panels for automobiles, appliances (e.g., refrigerators, ovens, washer/dryer, etc.) heating and air-conditioning conditioning control systems, security systems, automatic teller machines (ATMs). A touch interface in these applications may be e.g., a touch-pad or may incorporate a screen and a graphical user interface (GUI).

SUMMARY

Some embodiments of the disclosure relate, generally, to a method of creating instructions for searching for an element of a graphical user interface (GUI) displayed on a contact sensitive screen. The method includes parsing a GUI definition and identifying elements of the GUI responsive to the parsing; creating a record comprising entries of identified elements; associating the identified elements with groups of similarly located elements; arranging the record of identified elements into a tree-like structure; collapsing identified elements in same groups into a single leaf in the tree-like structure; optimizing the tree-like structure; and creating a search instructions list responsive to the tree-like structure.

Some embodiments of the disclosure relate, generally, to a computer program product for enabling a computer create executable instructions to search for an element of a graphical user interface (GUI). The program product may include a computer readable medium and software instructions on the computer readable medium. The software instructions on the computer readable medium adapted to enable the computer to perform the operations of: parsing a GUI definition and identifying elements of the GUI responsive to the parsed GUI definition; creating a record comprising entries of the identified elements; associating the identified elements with groups of similarly located elements; arranging the record of identified elements into a tree-like structure; collapsing identified elements in same groups into a single leaf in the tree-like structure; optimizing the tree-like structure; and creating a list of search instructions responsive to the tree-like structure.

Some embodiments of the disclosure relate, generally, to a microcontroller operably coupled to a touch screen configured to display a graphical user interface (GUI). The microcontroller includes at least one processor and one or more executable instructions stored on a non-transitory storage medium. The instructions, when executed by the processor, are adapted to enable the processor to: determine a location of a sensed touch at a touch screen; and identify a GUI element associated with the location of touch corresponding to the sensed touch.

Some embodiments of the disclosure relate, generally, to a method of identifying an element of a graphical-user-interface (GUI) displayed at a touch screen. The method includes determining a location of a sensed touch at a touch screen; executing one or more search instructions responsive to the location, wherein each search instruction of the one or more search instructions corresponds to a GUI element, and, when executed, is adapted to return a search result; and identifying a GUI element responsive to the search result.

Some embodiments of the disclosure relate, generally, to a system. The system includes a display subsystem and a touch subsystem. The display subsystem is configured to control a display. The touch subsystem includes a touch sensor and a touch controller. The touch controller is configured to determine a location of a sensed touch at the touch sensor; execute one or more search instructions responsive to the location and a search tree, wherein each search instruction of the one or more search instructions corresponds to a GUI element, and, when executed, is adapted to return a search result; identify a GUI element responsive to the search result; and generate a haptic control message responsive to the identified GUI element.

Some embodiments of the disclosure including a contact-sensitive GUI that utilizes virtual widgets, each comprising an assemblage of shapes (e.g., including one or more active UI elements) included in a displayable GUI screen. For example, a virtual widget may comprise a defined assemblage of multiple instances and/or types of virtual buttons, sliders, knobs, dials, etc. As another example, a virtual widget may comprise a defined assemblage of active elements that collectively define an interface for controlling a defined function.

In some embodiments, virtual widgets may be displayed on the touchscreen, but in some embodiments exist only in the context of a touchscreen configuration module/process and on the touchscreen display. Virtual widgets may report to a head unit. The use of virtual widgets may reduce the physical interface complexity of the touch-sensitive GUI. For example, the use of virtual widgets may reduce overhead on the head unit to process touch positions, and may require no separate hardware or electronics for physical rotors, sliders, etc., e.g., for heating controls, radio controls, or any other type of controls.

Some embodiments provide systems and methods for defining, in a configurable manner, areas of a touchscreen (e.g., areas in a configured screen page) to be operated as virtual widgets (e.g., buttons, sliders, dials, etc.). When a touch is detected on the touchscreen, a touch controller may determine a position or state of the widget corresponding with the user touch (e.g., the linear position of a virtual slider or the rotational position of a virtual dial corresponding with the detected touch position), and report such position/state information in a "widget message" to the head unit instead of, or in addition to, reporting a "touch message" indicating the position of the touch on the touchscreen. Widget messages may indicate, for example, a user-selected position, rotation, 'touched' status, and/or number of detected touches on a respective widget, corresponding with the detected touch location, force, and/or other measurable aspect of the detected touch on the touchscreen.

Utilizing virtual widgets may simplify the required processing of a head unit. For example, the use of virtual widgets may allow a single screen design to have multiple applications. For example, one interface may handle every product variant, via suitable configuration.

Some embodiments may include static physical structures, e.g., physical ridges, bumps, grooves, etc., integrated in a touchscreen surface for providing tactile feedback to a person. Such structures are referred to herein as "static widgets." In some embodiments, static widgets may be used in combination with (a) virtual widgets (e.g., wherein a virtual widget is co-located with a corresponding static widget in the touchscreen surface) and/or (b) actual physical widgets (e.g., rotating dials, etc.) that use an underlying virtual widget to detect its position.

Static widgets may provide a physical "feel" to corresponding virtual widgets or other UI elements displayed at the touchscreen. Thus, static widgets may allow a user to provide input at the touchscreen GUI by feel without looking at the touchscreen, which may be particularly useful in automotive applications or other applications in which the user's visual focus may be directed elsewhere. In some embodiments, the system is configured to report to the head unit a control position of a static widget being touched, as opposed to the position coordinates of the touch on the screen, as the system may provide special touch processing of the widget area.

A static widget may replace physical moving parts to increase the robustness of the system, as compared with conventional systems, and may reduce component count and inter-processor interfaces. In addition, multiple instances of one or more types or shapes of static widgets can be provided on a single screen. In some instances, static widgets may be used to replace one or more rotors (dials or knobs), sliders, buttons, switches, or any other types of physical interfaces.

Some static widgets may be at least partially embedded in, or otherwise physically coupled to, the main body of the touchscreen cover, thus referred to as "embedded static widgets." In some embodiments, embedded static widgets may be formed from one or more different materials than the main body (e.g., glass or polymer) of the touchscreen cover. For example, an embedded static widget may be formed from material(s) having higher or lower dielectric constant (s) than the main body of the touchscreen cover, e.g., to provide a desired capacitive touch-sensitive response.

Thus, one embodiment provides a touchscreen system including a touchscreen cover layer formed from a first material having a dielectric constant, and a tactile structure coupled to the touchscreen cover layer and defining a non-planar surface texture, wherein the tactile structure is formed from at least one second material having a different dielectric constant than the first material of the touchscreen cover layer.

Another example embodiment provides a touch-sensitive touchscreen system including a touchscreen cover layer, and a tactile structure formed in or coupled to the touchscreen cover layer and defining a non-planar surface texture (e.g., embodied as a ridge or other raised structure or a groove or other depression) that provides tactile feedback to a user's finger. In some embodiments, the tactile structure is formed from at least one material having a different dielectric constant than the touchscreen cover layer. A touchscreen display device arranged under the touchscreen cover may be configured to display a configurable graphical user interface (GUI) including a respective virtual user interface element at a location corresponding with the tactile structure. The system may include a processing unit configured to sense a touch at a location of a particular virtual user interface element, identify the particular virtual user interface element, and initiate an action associated with the virtual user interface element.

BRIEF DESCRIPTION OF THE DRAWINGS

Example aspects and embodiments of the present disclosure are described below in conjunction with the following appended drawings:

FIGS. 10A-10E show UI elements in a tree-structure formed according to embodiments of the disclosure. (available in color);

DETAILED DESCRIPTION

Figure 1:
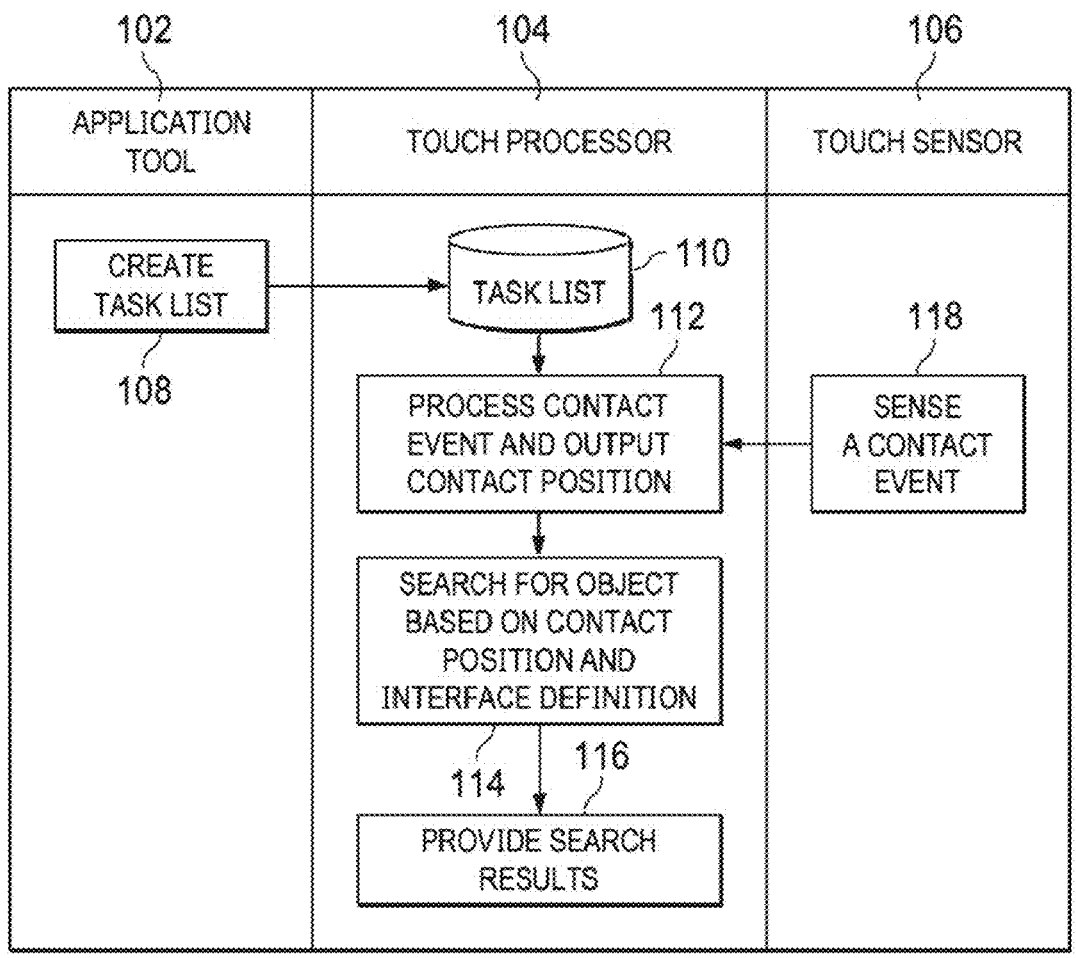
FIG. 1 is a swim-diagram illustrating the process of generating and using a search task list to identify contacted UI elements in a GUI.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure. The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be rearranged.

A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

The various embodiments described in this disclosure relate, generally, to techniques for determining UI elements selected on a contact-sensitive user interface and using those techniques to provide one or more haptic responses. As understood for purposes of the embodiments described herein, a contact sensor may respond to an object's (such as a finger or a stylus) contact with, or the object's proximity to, a contact-sensitive area of a touch interface. In this disclosure "contact" generally refers to an object's physical contact with a contact-sensitive area, but it may also encompass the close proximity of an object that produces a measurable response by the contact sensor. Further, a contact-sensitive area refers to the physical area on a touch interface where a contact sensor may respond to an object's contact.

A contact-sensitive GUI as used herein refers to a touch interface integrated with a GUI. For example, a GUI typically includes one or more display regions and active/active regions. In this disclosure, a display region is a region of a user interface which displays information to the user. An active region is a region of a GUI, such as a button, slider, or a menu, which allows the user to take some action with respect to the user interface. Some display regions are also active regions in that they display information and some action may be taken. In a contact-sensitive GUI, contacting a touch-sensitive area on which an active region is displayed may activate that region (e.g., tapping a GUI button on a touch screen). Active regions may be displayed as GUI elements/objects, for example, buttons, sliders, selectable panes, menus, etc., all of various shapes and sizes.

Generally, if contact is sensed at a contact sensitive area, a process is used to determine the active region(s) of the GUI to which the contact corresponds, if any. For example, if an "ENTER" button is tapped, the contact is measured and an algorithm is executed to determine that the contact was made at the location of the ENTER button. The ENTER button is an active region so events are created in the touch sensitive GUI and/or the underlying application program that invoked the GUI.

Further, if a particular GUI element is associated with the active region, actuators integrated with the touch interface may provide one or more physical response, commonly referred to as haptic responses. These may be in the form of forces, vibrations, or movements and may mimic surface textures, ridges, edges, interactions like pushing/clicking a button, as well as other simulated sensations and responses. In the case of a GUI, the haptic response may be localized to the GUI element with which a user interacts. For example, if a user touches a GUI button the haptic response may make the button feel raised with an edge, as if it were depressed, or like it has a rough texture.

As discussed below, e.g., with reference to FIGS. 14 and 15, in some embodiments, a contact-sensitive GUI may utilize "virtual widgets," which include any assemblage of shapes (e.g., including one or more active GUI elements/objects) included in a displayable GUI screen. For example, a virtual widget may comprise a defined assemblage of multiple instances and/or types of virtual buttons, sliders, knobs, dials, etc. As another example, a virtual widget may comprise a defined assemblage of active elements that collectively define an interface for controlling a defined function. For instance, a slider-type virtual widget or a rotatable dial-type virtual widget may consist of a defined collection of UI elements that relate to a range of positional selections for the slider or rotatable dial, e.g., as illustrated by the example rotatable dials shown in example FIG. 15, discussed below. It should be understood that any disclosure herein regarding GUI elements (also referred to as UI elements) or shapes similarly applies to virtual widgets.

The various embodiment described herein may sometimes refer to creating and updating electronic records. The electronic records may be in the form of a data file, and updating an electronic record may include inserting or deleting data entries in one or more fields of the record. Alternatively, at runtime, it may refer to a class object and instantiated objects having state information and variables consistent with the described record. Both situations are contemplated in the various embodiments described herein.

The various embodiments of this disclosure relate to techniques for identifying those GUI elements that have been contacted on a contact sensitive interface. These techniques and associated structures are particularly efficient in terms of memory use and responsiveness.

Further, the interface data storage requirements are small, and the number of tasks performed at execution time to identify a UI element are few, as compared to other techniques.

Some embodiments of the disclosure relate to a process for creating a list of optimized search tasks that may be performed to identify the GUI elements that were contacted on the contact sensitive interface. Such search may be referred to herein as a UI element search or a "shape search." The search tasks may be processor executable instructions that, when executed, return a success or failure message to the sub-system that is searching for the element of the GUI that was contacted, if any. In one embodiment, the search tasks are created based on a definition file that maps out the various elements and their locations in a GUI. The search task may be optimized for various efficiency parameters.

In one embodiment, the search task list may be executed by an embedded device, for example, a touch controller as compared to conventional contact sensitive GUIs known to the inventors of this disclosure that may perform the UI element/shape search in a display sub-system (e.g., an automotive head-unit). Performing a search for a GUI element in a touch controller saves time communicating with the display sub-system and time for the sub-system to respond and communicate with, for example, a haptic feedback sub-system. The saved time improves the responsiveness of contact-sensitive GUIs as compared to the conventional contact-sensitive GUIs, and from a user's perspective, shortening the time from when he/she touches a screen to when they receive feedback responsive to the touch.

Moreover, creation of the task search list is configurable, and, depending on the GUI, sets of common features may be selected for an implementation that are optimized for the specific application. For example, in some embodiments the creation process may be optimized for a GUI that includes paging, drop down menus and pop-up windows that obscure other GUI elements, elements of certain shapes, or elements that move or deform when they are contacted.

FIG. 1 illustrates an overall operation of a system according to various embodiments of the disclosure. In operation 112, a software application tool 102 is configured to process a UI definition file to create a search task list (operation 108) of conditioned executable instructions for performing a UI element/shape search to identify a UI element, if any, that has been contacted on a contact sensitive screen.

The search task list may be stored (operation 110) in a non-transitory storage memory that is accessible by one or more processors that are part of a touch system. When a contact event occurs at a touch interface, a touch sensor 106 may sense the touch (operation 118) and provide one or more signals indicative of the touch to one or more touch processors 104. The touch processors 104 determine (operation 112) a location on the touch interface where the contact occurred, and in response to that determination, search (operation 114) for and identify a UI element, if any, which was contacted. In one embodiment, the touch processor 104 may provide (operation 116) the search results to a graphical user interface subsystem.

An embodiment of a process to create a search task list will be described with reference to FIGS. 2-7. Embodiments of the disclosure utilize a search tree structure that organizes UI elements according to a tree and grid technique. The various UI elements are divided into related groups that are treated like grids, organized into a search tree, and then various search tasks are generated. The search tasks are conditioned to optimize execution of a UI element/shape search using the instructions. One of ordinary skill in the art will understand that other algorithms might be used to divide the screen(s) into searchable regions, for example, a divide and conquer method.

Figure 2:
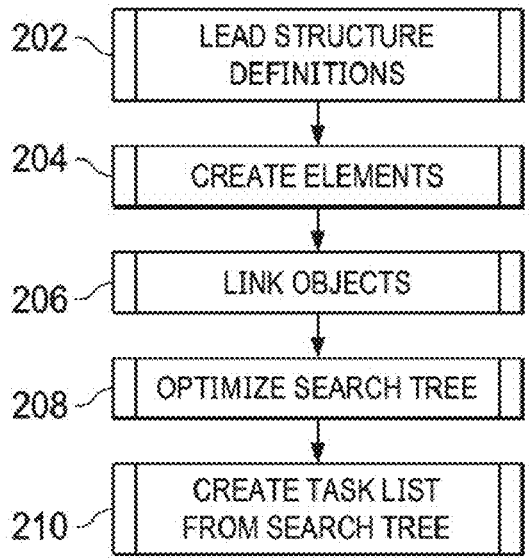
FIG. 2 is a flow-chart of a process for generating a search task list according to an embodiment of the disclosure.

FIG. 2 illustrates an embodiment of a process of generating a search task list for performing a UI element/shape search. In operation 202, a structure definition for the UI is loaded and parsed to identify screens, subscreens, and UI elements on those screens and sub-screens. The UI structure definition may be an electronic file, a database, raw data, or the like. In operation 204, the UI elements are grouped and the searchable area is divided into one or more searchable regions having UI element groups. In operation 206, the UI element groups are linked into a tree structure based on the searchable regions. In operation 208, search tasks are associated with the search tree branches and nodes to form a search tree, and the search tree is optimized. In operation 210, the conditioned tasks of the search tree are stored in a list, which is the task list that may be executed by a processor.

In one embodiment, the software application tool 102 that generates the search task list may be configured to write the results of one or more of operations 202, 204, 206, 208, and 210 to an output file. This may be used by a debugging tool to review the results of the process. The same debugging tool may be configured to use a textual version of a search task list and execute it within a virtual test environment (as, e.g., a .dos executable) to verify the search task list is operationally ready.

Figure 3:
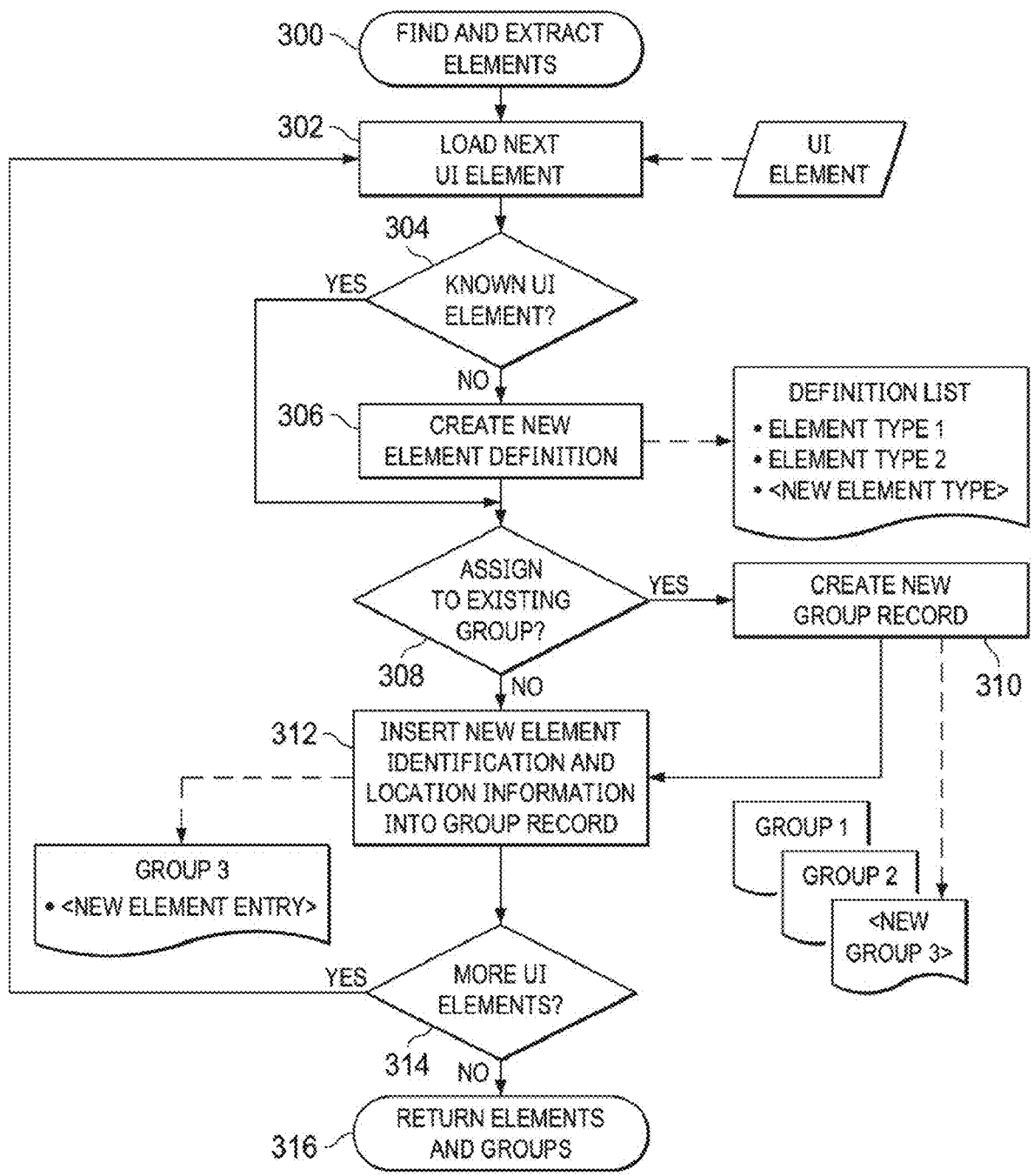
FIG. 3 is a flow-chart of a process for extracting the UI elements from a UI structure definition according to an embodiment of the disclosure.

FIG. 3 illustrates an embodiment of a process 300 for extracting UI elements from a UI structure definition. In one embodiment, the UI structure definition is an xml definition of the parts of a display that are to be converted by the configuration generation features of the application tool. The application tool parses the structure definitions and grabs the UI elements defined in the definition structure. In operation 302, each UI element is loaded and, in operation 304, a determination is made whether it is a known UI element. If it is not a known UI element (i.e., this is the first time this element has been identified in the structure definitions), then, in operation 306, the process creates a new element definition for that type of UI element (e.g., button, knob, slider, etc.).

After creating the new definition, or if the element is a known UI element, then, in operation 308, a determination is made whether to assign the element to an existing group. In one embodiment, the determination whether to assign to an existing group is based on various pre-determined parameters, for example, common features of elements, such as the type of element, the screen location where the UI element is displayed, a layer-position, a type of response associated with the element (e.g., visual, haptic, audio, etc.), and the like. If the decision is made to assign the element to a new group, then, in operation 310, a new group record is created with parameters related to the element.

After a new group record is created, or if a determination is made to assign the element to an existing group, then, in operation 312, a new element entry is inserted into the group record for that new element. In one embodiment, the entry includes fields for the element ID and the location of the element (i.e., the coordinates of the element on the screen). In operation 314, a determination is made if there are more UI elements, and if there are more UI elements then the process is performed for each remaining UI element identified in the UI structure definition. In operation 316, the process returns the element(s), element definition(s), and group(s).

In one embodiment, if the UI structure definition includes more than one screen definition then each such screen is assigned a screen ID that is a parameter of the UI element. It may also be incorporated as parameter for each group. Each screen may also include sub-screens, which are defined areas of a displayed GUI where some UI elements dynamically change while UI elements outside those areas remain static. By way of non-limiting example, areas with dynamic UI elements may include swappable panes, scrollable menus, activatable information panes, navigation buttons, and the like.

Figure 4:
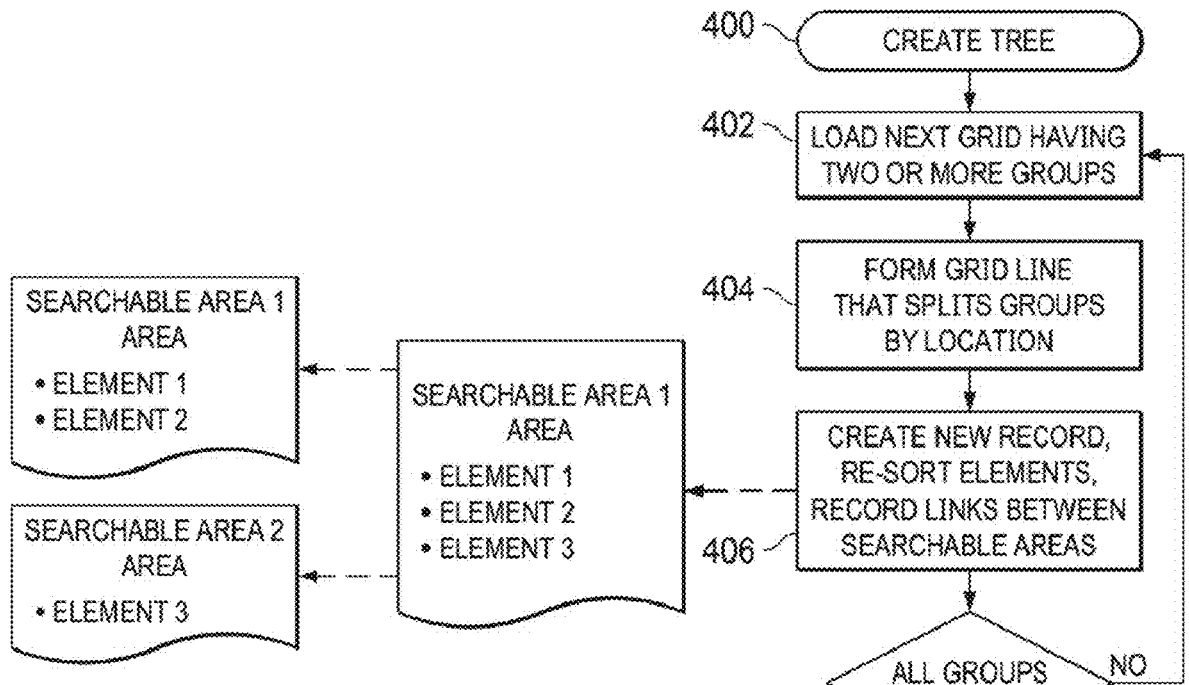
FIG. 4 is a flow-chart of a process to generate an intermediate search tree according to an embodiment of the disclosure.

FIG. 4 illustrates a process 400 to create a search tree according to an embodiment of the disclosure. In this process, a determination is made about how to divide each screen identified in the UI definition into searchable areas, each searchable area including one or more groups of UI elements. In the example embodiment shown in FIG. 4, a dividing line (x-y-coordinates) is selected that divides groups of UI elements such that at least one UI element group is on one side of the dividing line and at least one other UI element group on the other side of the dividing line.

The dividing line effectively divides the screen into two searchable regions with a shared boundary along the dividing line. The UI element groups are divided in a recursive manner until the UI element groups cannot be further divided.

In another embodiment, the screen or searchable areas are divided simultaneously in both x- and y-coordinate directions, which may result in up to four subdivision of the UI element groups. This technique could also result in fewer than four subdivisions, for example, three divisions of UI element groups and one empty searchable region.

In yet other embodiments, circles, squares, and/or polygons may be used to define a portion of the screen to exclude from the searchable areas, such that the screen is not sub-divided into searchable areas.

In operation 402, the first searchable area is loaded having two or more groups. For the first iteration, this may be the entire screen including all groups. In this embodiment, an initial searchable region record exist with an area defined to encompass the entire screen, including all UI elements and UI element groups. In operation 404, a grid line is selected that divides the initial searchable region into two searchable regions each having some of the groups. In operation 406, a new record is created, the UI element groups are sorted among the initial record and the new record, and the records are updated with their respective searchable areas. The dividing line is recorded as a split/division between the two searchable areas. The first searchable area and the UI element groups and UI elements therein are linked to the division, which in turn is linked to the new searchable area and the UI element groups and UI elements therein.

At runtime, there will exist class objects of UI elements, class objects of UI element groups, and class objects of splits/divisions.

For each searchable area containing more than one UI element group the process is recursively executed (operation 408) to divide the searchable areas.

Notably, in one embodiment, the UI elements are defined by a reference to a UI element definition (e.g., an element ID) and a move to a UI element's origin in this embodiment, the interface memory requirements are reduced because each UI element does not have to be individually defined.

Once a screen is fully divided, an intermediate search tree comprising divisions/splits, UI elements, and UI element groups, and links therebetween, now exists.

In operation 410, group level search tasks are created for each UI element group. A group level task is a process step or series of process steps. The tasks may include: (i) tasks to determine if a touch or contact event occurred within a UI element (or without a UI element); (ii) tasks to modify the search region in some way; and (iii) tasks to set up for the next task.

Each group level task may include an indication of the next task to be performed in the event of success or failure. For example, each task may include a bit with an "offset" to the next task address. Further, each group level task may accept arguments when it is executed. In some embodiments, the previous task may provide the arguments or set an environmental bit/flag to indicate which arguments are available to the next task.

In one embodiment, the offset in the UI element group coordinates (angle of position) may be used to generate an index. Every UI element in a searchable area may, if configured, be assigned a different ID that is offset by the index from the base ID of the searchable area. The result is an element ID and an offset value. Separate provisions exists for modifying either responsive (e.g., haptic) or element ID—so one group element might return a single element ID but multiple responsive IDs, and another might return one responsive ID for a number of different of elements.

The group level search tasks may be inserted into the group records, inserted into a search task list, or inserted into an intermediate record. Once the group level search tasks are completed, then in operation 412 the intermediate search tree is returned.

In one embodiment environmental variables may be set for each task that indicates, if applicable, what will be returned if the task is performed, is a success, and is the final task. By way of non-limiting example, an environment variable may be a haptic ID, values to control how the element ID and haptic ID are modified for an element within a group shape, etc. Environmental flags may also be set which indicate the data to be sent to accompany the next task description. By using certain constraints and the correct environmental variables, a definition, for example, of a circle may be reduced from 7 to 2 bytes.

Figure 5:
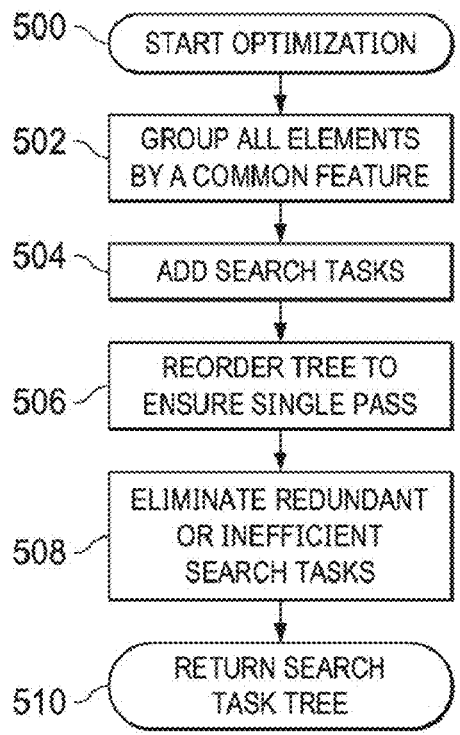
FIG. 5 is a flow-chart of a process to generate a search task tree according to an embodiment of the disclosure.

FIG. 5 illustrates an embodiment of an optimization process 500 performed on the intermediate search tree. In operation 502, all UI elements are grouped by common features. Examples of common features include UI element type, position in a layer, position relative to another element in another layer (e.g., all behind the same UI element), a display group, shape, or more. In one embodiment, common features may be selected to optimize a UI element/shape search process. For example, if UI elements are grouped by layer-position with the UI elements on the top layer at the top of the search tree then those will be searched first. By way of another example, in an application where there is "paging" (i.e., layers of a user interface can be swiped to expose layers underneath or to pull a layer over another layer), grouping by display group allows control of all displayed UI elements using a single control—e.g., search for all UI elements in a display group, apply changes to those UI elements responsive to the control settings, turn on or off all UI elements in a display group, etc. In various embodiments, identifiers may be used to identify groups organized by common features, e.g., layer IDs, position IDs, shape IDs, etc.

In operation 504, search tasks are inserted into the search tree for each element and split to form an intermediate search task tree. In operation 506, the intermediate search task tree is re-ordered to ensure a single pass through for each task. In operation 508, redundant or inefficient search tasks are eliminated. In operation 510, the optimized search task tree is returned.

Figure 6:
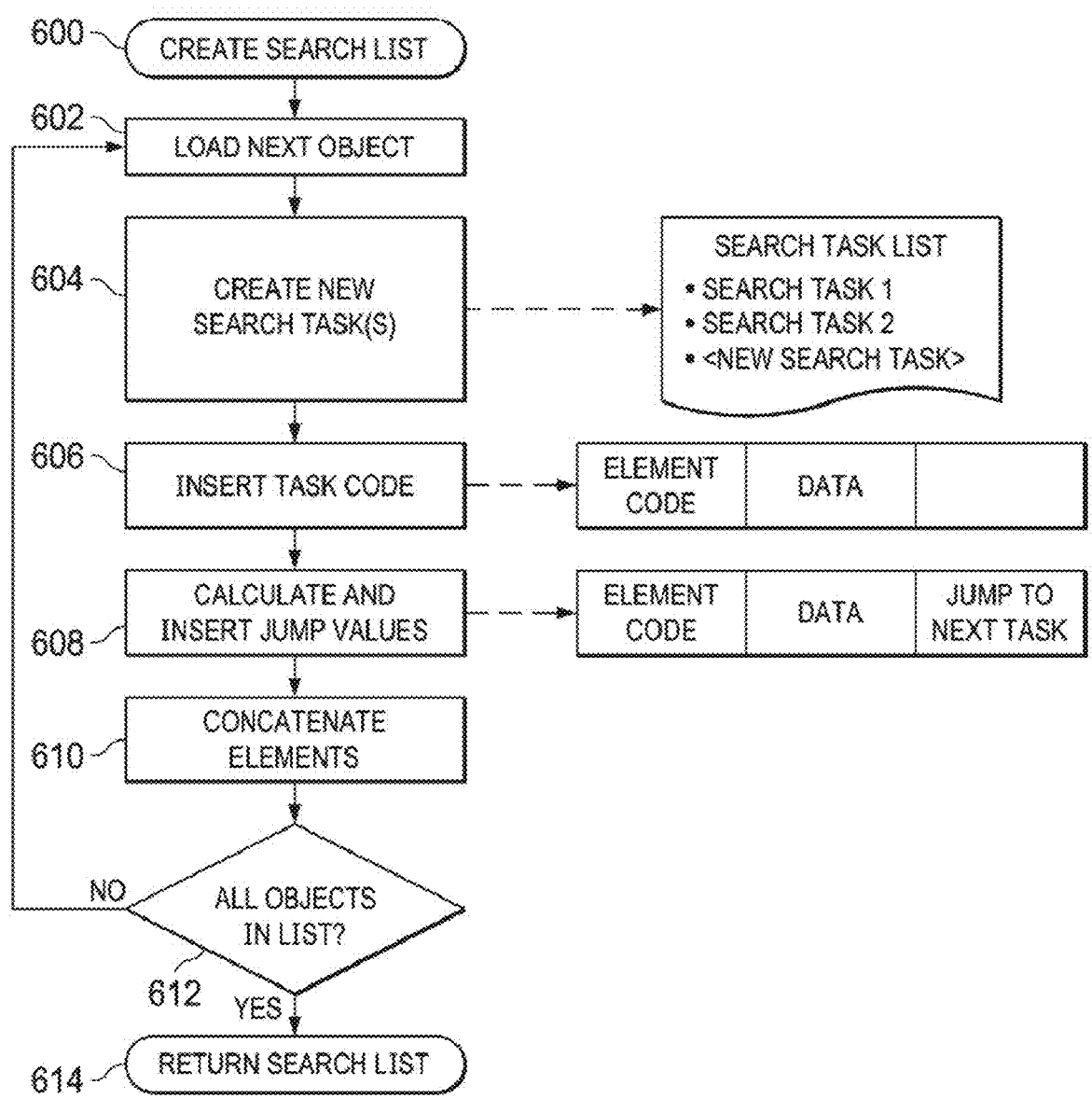
FIG. 6 is a flow-chart of a process to generate a search task list according to an embodiment of the disclosure.

FIG. 6 illustrates an embodiment of a process 600 to create a search task list. In operation 602, the class objects in the search task tree are loaded and, in operation 604, instruction words (i.e., search tasks) are created from the class objects and the instruction words (i.e., search tasks) are inserted into a search task list. In the embodiment shown in FIG. 6, the instruction word includes a task code field and a jump field. In one embodiment, the instruction word includes a data field. Every failure (i.e., the element is different) and every split requires a jump to another instruction unless the next task immediately follows the current task in memory.

In operation 606, the task codes are inserted into the task code field, and in operation 608 the jump values are inserted into the jump field.

In some embodiments some or all of the jump values are not inserted until all tasks are inserted into the search task list. In other embodiments, jump values may be inferred from the search task tree.

In operation 610, the various tasks of the search task list are concatenated in memory to form a conditioned search task list that, if all objects are in the list (operation 612), is returned by the process in operation 614. The search task list and search tree may be stored in memory.

The task instructions may vary by container size restrictions (i.e., byte restrictions) available in the particular environment in which the search task list will be implemented. In one embodiment, the data associated with each task instruction may vary depending on system requirements, including an instruction interface requirements (8-bit, 12-bit, 16-bit, etc.), available memory, etc. By way of non-limiting example, an instruction to search within an 8-sided polygon shaped UI element may be performed with just x and y coordinate data and the number of sides. However, additional data may be included to if the instruction interface and other memory requirements permit.

Figure 7:
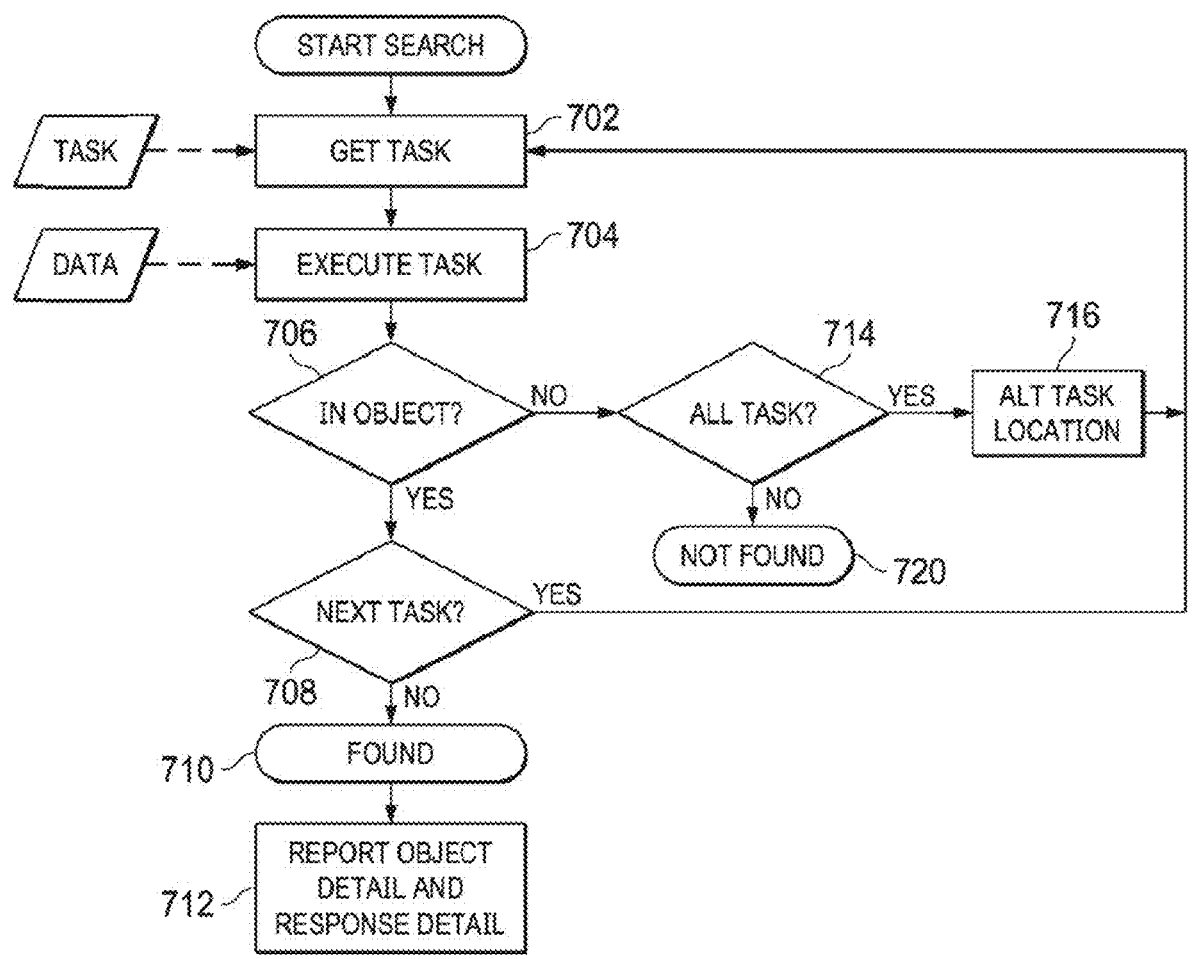
FIG. 7 is a flow-chart of a UI elements/shape search process to determine if a touch occurred within a UI element, according to an embodiment of the disclosure.
Figure 8:
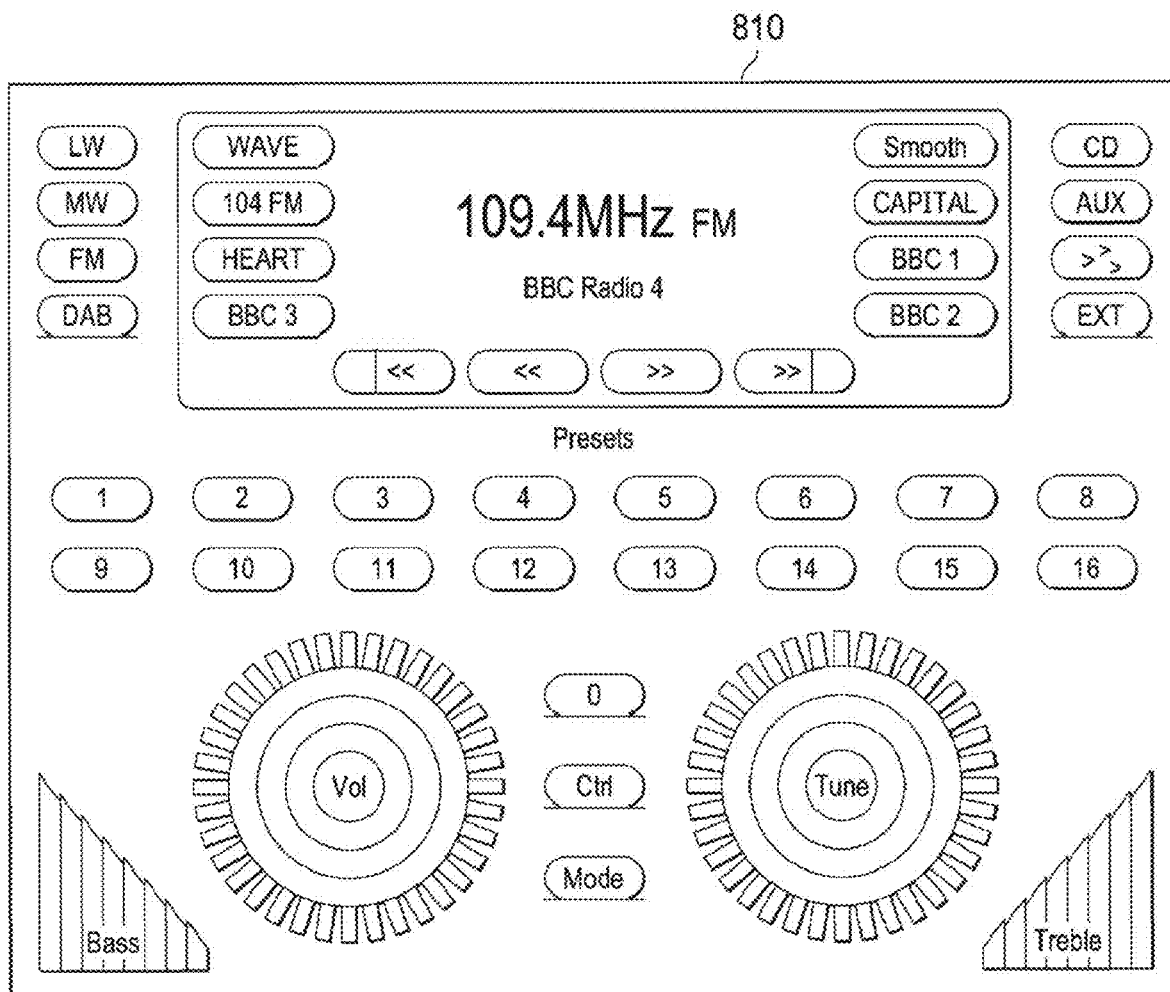
FIG. 8 shows an embodiment of a radio GUI comprised of UI elements. (available in color)

FIG. 7 illustrates a UI element/shape search process to determine if a touch occurred within a UI element, according to an embodiment of the disclosure. The search of the search tree is performed using provided data and the search task list. In operation 702, the executable instruction for each task is provided on the processor's interface sequentially with the payload data for each task, and executed in operation 704. As the search tree is searched, a determination is made in operation 706 if the touch occurred within a UI element, and the result of each task is a true/false, success/failure that indicates if the touch occurred within a UI element. In operation 708, the next task instruction and related data is loaded and received by the processor responsive to the result of the current task being a success. That is, if the result of operation 706 is a success then the next task in the task list is executed.

If the result is a failure then an alt task instruction and related data is loaded and received by the processor responsive to the result. If there is an alternate task (operation 714) then the alternate task location is supplied in operation 716 and the process loops back to operation 702, and the tasks is loaded from the alternate location for the processor. When the search is exhausted the UI element is either found or not found. If the UI element is found then a found result is returned in operation 710, and in operation 712, the ID for that element is returned as well any environmental settings/responsiveness parameters. If the operation is not found, then a not found result is returned in operation 720.

In one embodiment, the UI element/shape search process shown in FIG. 7 may be a firmware application executing at a touch processor (microcontroller). The touch processor may have the one or more search tasks that are executed by the search process stored in a flash memory. In one embodiment, search tasks may be stored at a RAM associated with a display controller, and the search tasks may be provided to a touch processor during a setup or provisioning process and kept accessible to the search process.

The described embodiments offer several advantages over alternative approaches. The memory requirements are significantly reduced—up to 50% from linear search, pure grid method or pure search tree method; and still an improvement over combination grid/tree methods. This is in part because the number of search operations performed is reduced. Because the number of search operations is reduced, the response cycles are significantly shorter than alternative approaches (which includes conventional approaches). For example, on a 1200×1200 contact sensitive GUI, cycle times of less than 36 μs were achieved, compared to alternative approaches that ranged from 72 μs (pure grid) to 1200 μs (linear). For a user, the difference is a much more responsive touch interface.

For a designer, the touch interface may be more sophisticated having many elements with different response characteristics.

FIGS. 8, 9 and 10A-10E illustrate processes illustrated and described with reference to FIGS. 2 through 7, in connection with a GUI for a radio application as one non-limiting example of a GUI that can be used with embodiments of the disclosure. The radio GUI 810 illustrated in FIG. 8 includes eight types of UI elements and a total of 144 UI elements, summarized in table 820.

Figure 9:
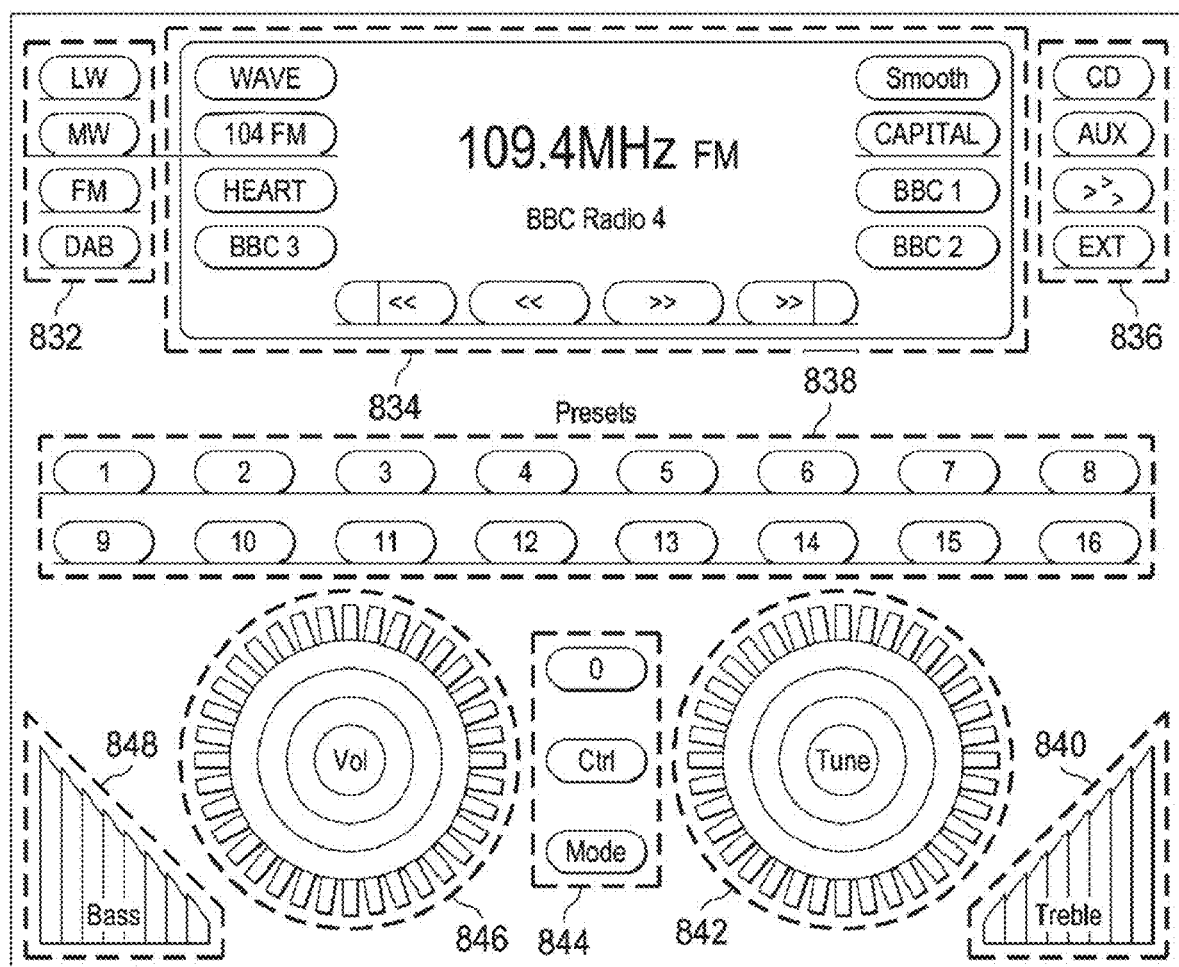
FIG. 9 shows the UI elements of the radio GUI of FIG. 8 grouped according to embodiments of the disclosure. (available in color)
Figure 10A:
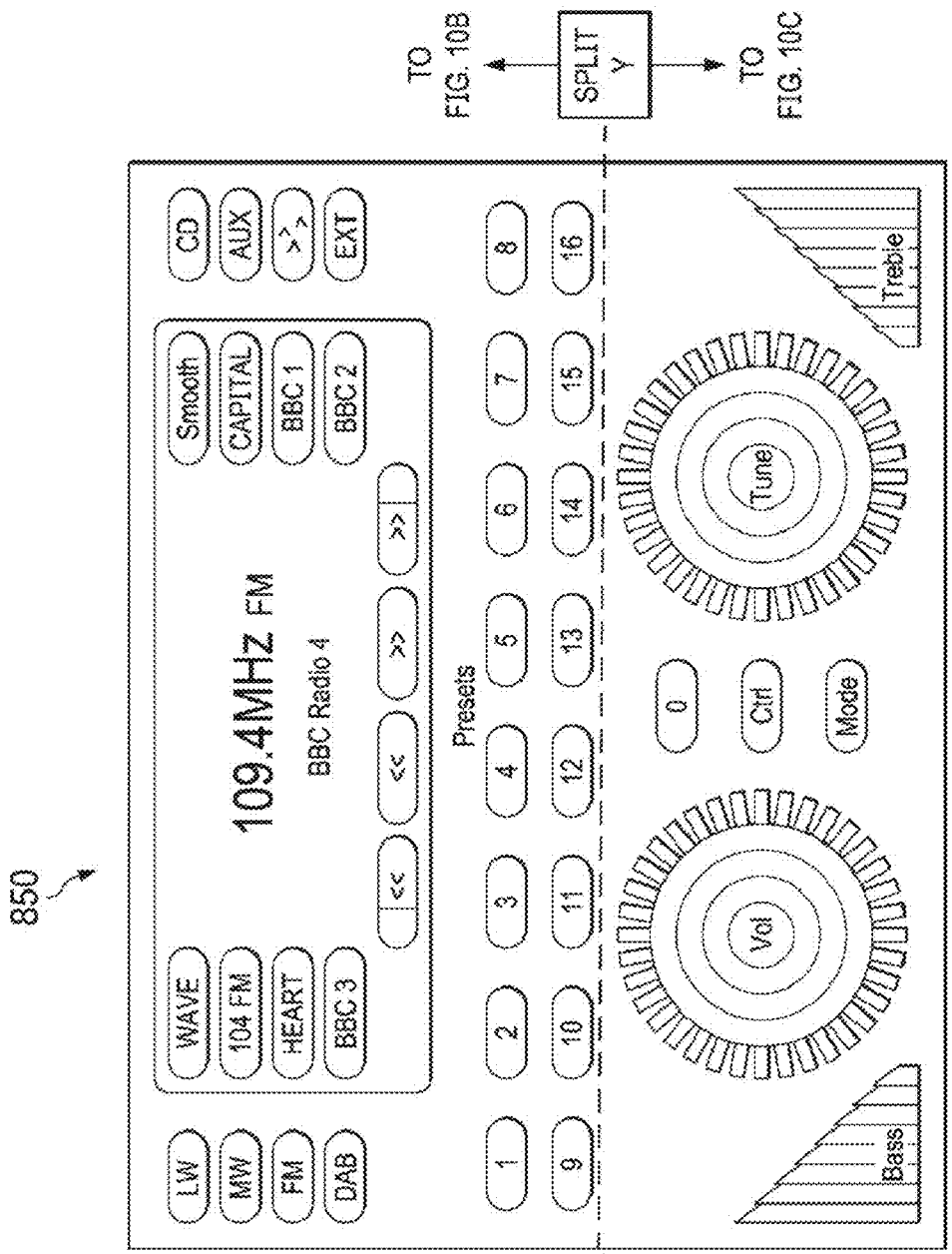
Figure 10B:
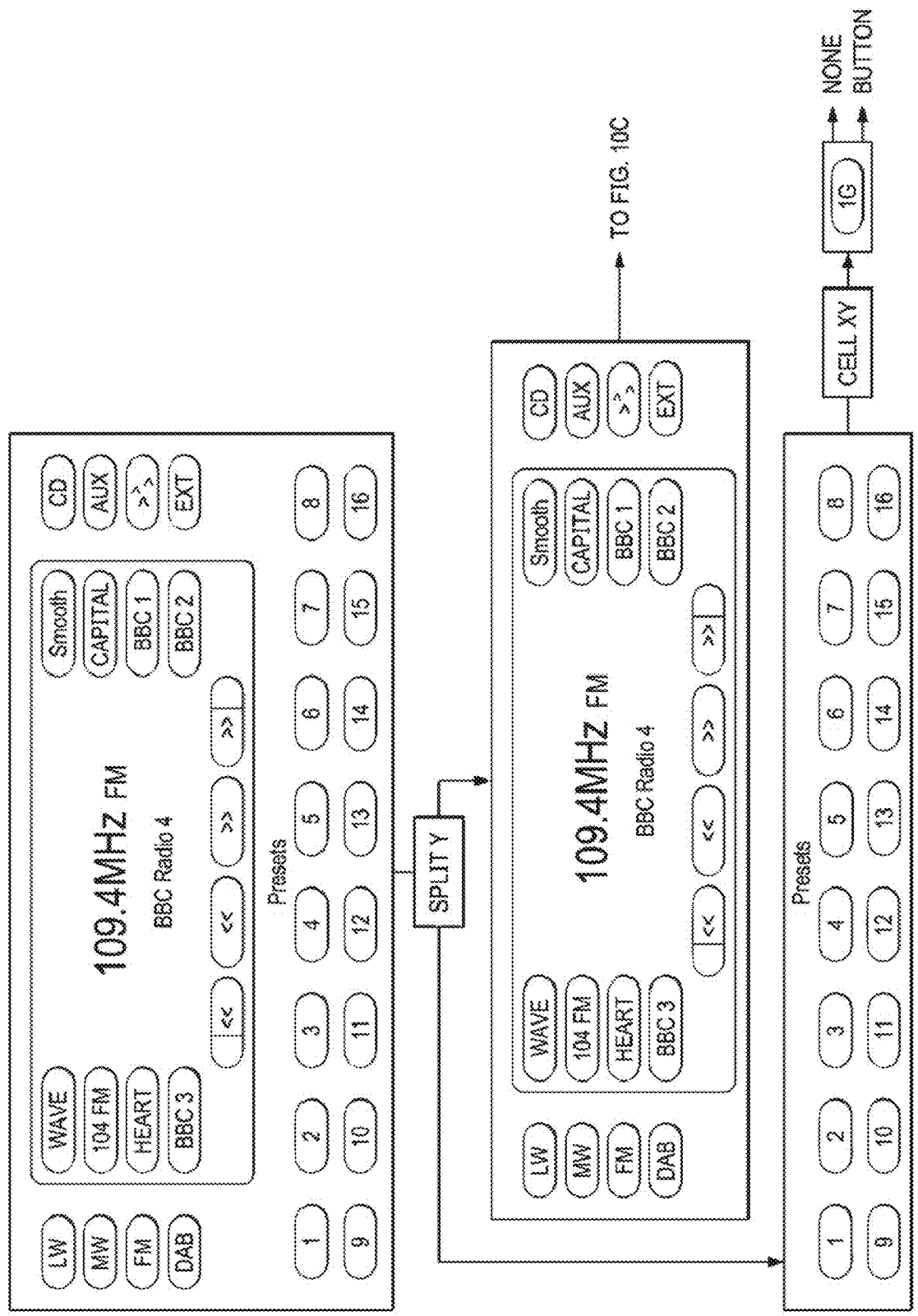
Figure 10C:
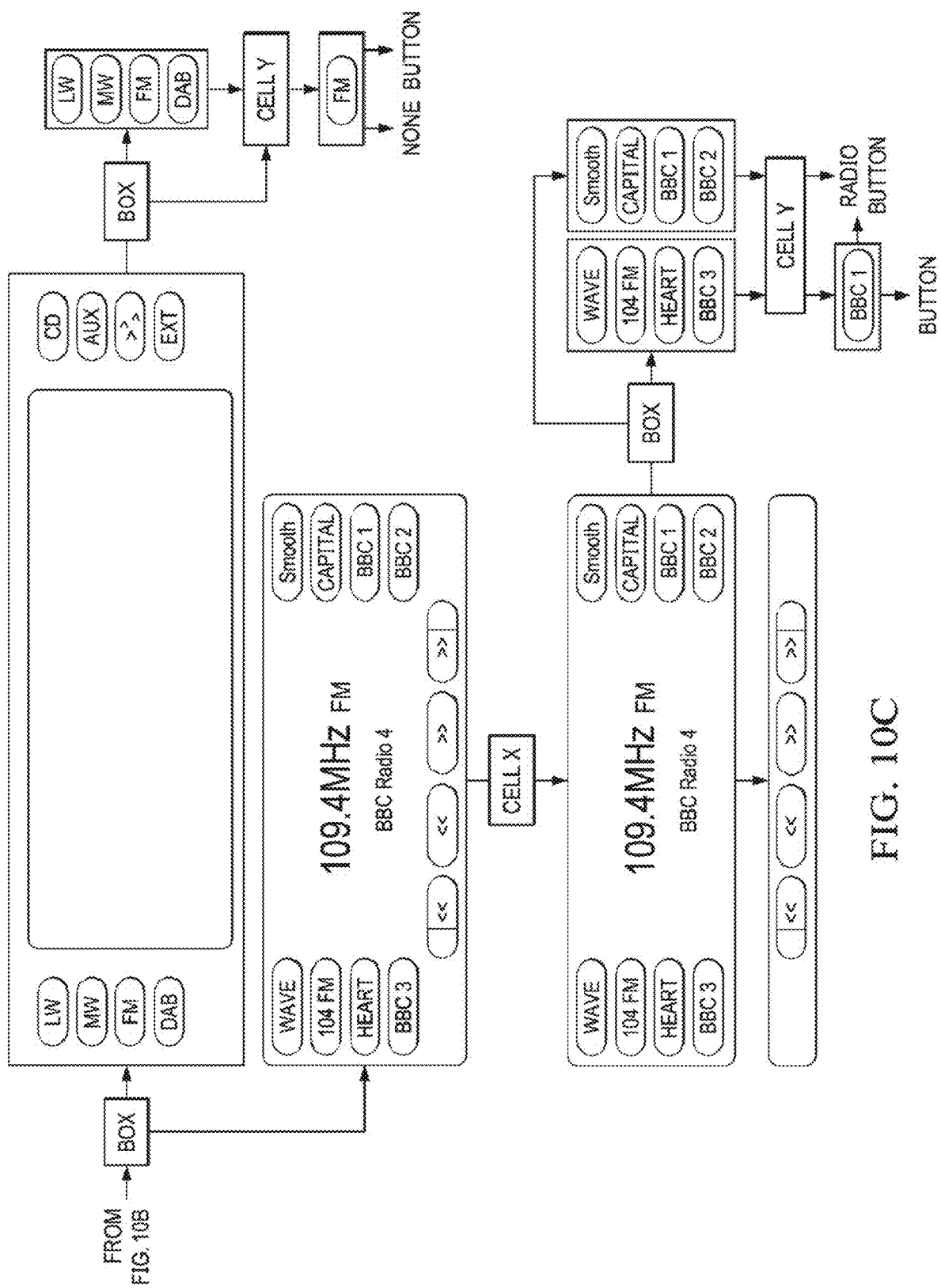
Figure 10E:
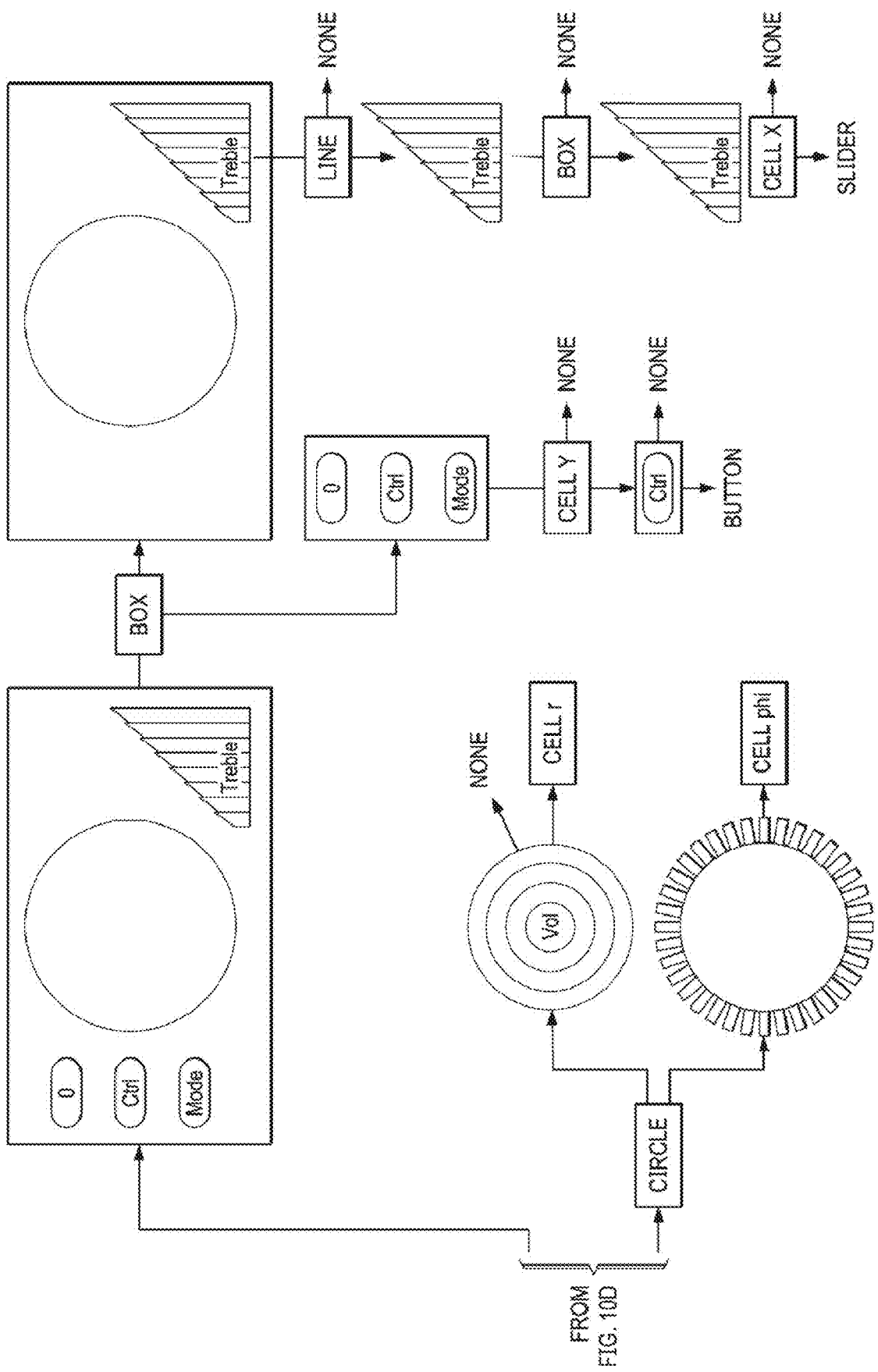

FIG. 9 shows UI elements grouped according to the methods described with reference to FIG. 3. In this embodiment, the grouped elements 832, 834, 836, 838, 840, 842, 844, 846, and 848 have similar touch characteristics (e.g., haptic feedback responsive to a touch), physical locations on the screen, and shapes.

FIGS. 10A-10E show an example of a tree structures 850 formed using the tree and grid method described with reference to FIG. 4.

Figure 11:
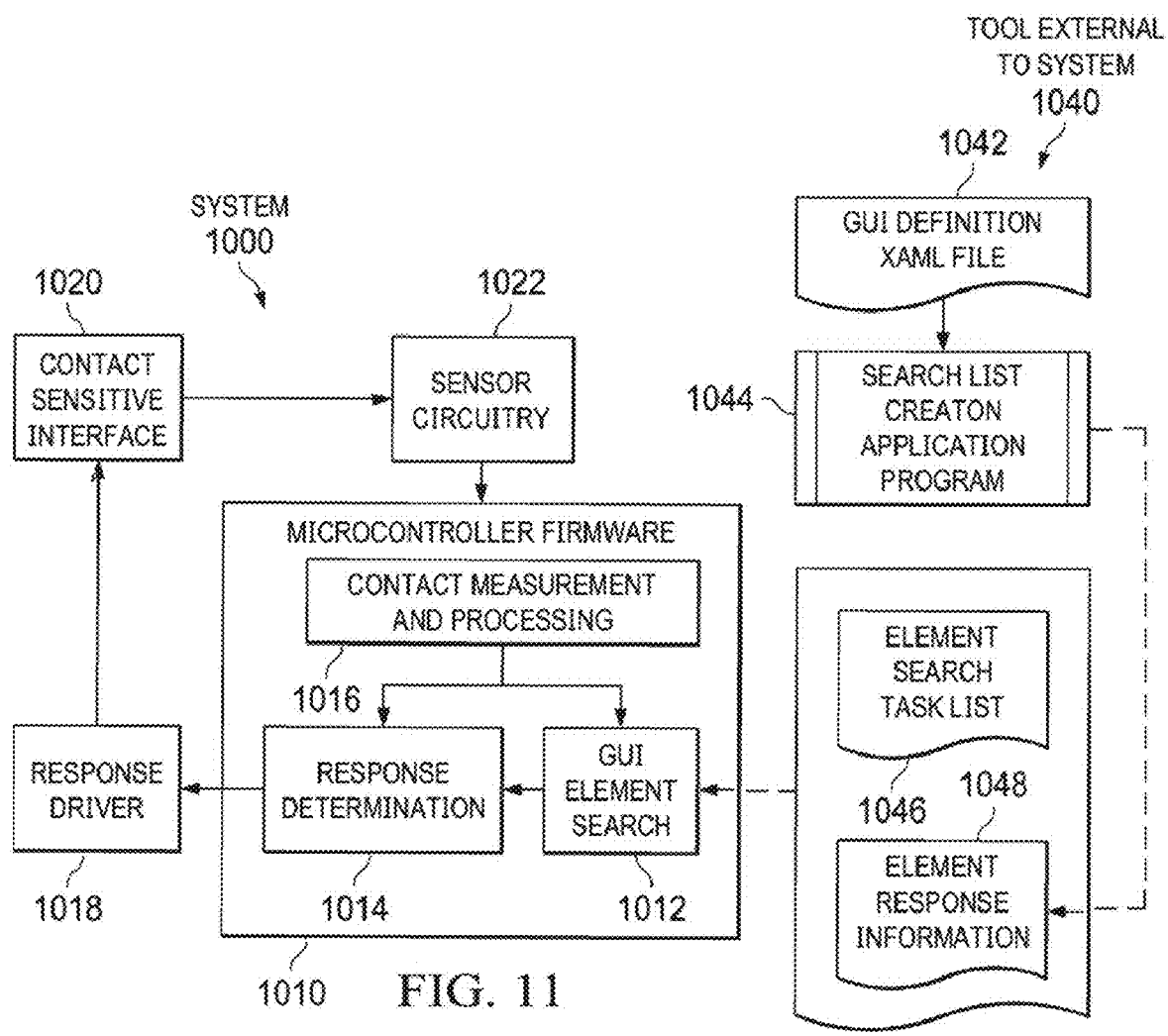
FIG. 11 shows an embodiment of a system incorporating search task lists.

FIG. 11 illustrates a system 1000 and related tool 1040 that may implement the UI element/shape searching methods described herein according to an embodiment of the disclosure. The system 1000 includes microcontroller firmware 1010 having thereon a GUI element searching functions 1012 and response determination 1014 for GUI elements. The processor executing the microcontroller firmware 1010 is coupled to a response driver 1018 that can receive control signals from the microcontroller firmware 1010 and in turn drive a response in a contact sensitive interface 1020. In one embodiment, the contact sensitive interface 1020 is a touch screen including one or more actuators, and the response driver 1018 is a haptic driver configured to generate control signals that will excite the actuators. Sensing circuitry 1022 may generate one or more measurement signals responsive to contact at the contact sensitive interface 1020. The contact measurement and processing 1016 may determine contact information (e.g., location, type, etc.) and provide it to the response determination 1014 and GUI element searching functions 1012 responsive to the measurement signals from the sensing circuitry 1022. The control signals received at the response driver 1018 may be based at least in part on the contact information, for example, so that haptic feedback is provided at the right location on the contact sensitive interface 1020.

Also shown in FIG. 11 is a tool 1040 that may implement a search list creation process and create an element search task list and element response information, according to an embodiment of the disclosure. A search list creation application program 1044 is configured to implement the processes described with reference to FIGS. 2-6 to process a GUI definition XAML file 1042 to generate an element search task list. The application 1044 may provide the element search task list 1046 and element response information 1048 as a file to the microcontroller firmware 1010. In one embodiment, it may also provide a search tree, although that may be incorporated in the search tasks.

In some embodiments of the firmware, the firmware may include force measurement and processing functions to incorporate force level information about a touch event. In those embodiments, the force level information and the GUI element ID and haptic response details returned by the element search function may be used by a haptic sequencer to generate haptic control signals responsive to said force level, GUI element ID and haptic response details.

The system of FIG. 11 may be incorporated in various consumer products, appliances and machinery that utilize touch interfaces and touch control panels, including automobiles.

Figure 12:
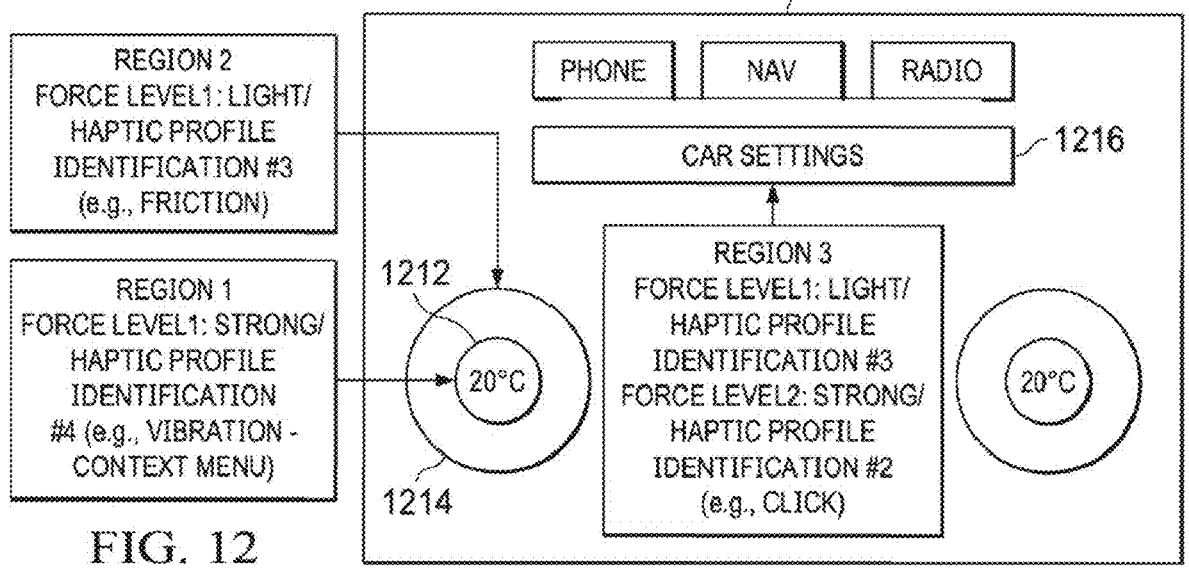
FIG. 12 shows an embodiment of a radio GUI including features and parameters associated with at least some of the UI elements of the radio GUI. (available in color)

FIG. 12 illustrates a simplified version of a radio GUI 1210 for an automobile touch control panel. Three regions are specifically called out: Region 1, Region 2, and Region 3. Region 1 is a button 1212 in the middle of a rotary dial 1214 for temperature control. Haptic feedback according to a haptic profile ID #4 (vibration) is provided in response to a touch event having a strong force level. Region 2 is the rotary dial 1214, also for temperature control. Haptic feedback according to a haptic profile ID #3 (friction) is provided responsive to a touch event having a light force level. Finally, Region 3 is a button 1216 to bring up a menu for car settings. Haptic feedback according to haptic profile ID #2 (click) is provided responsive to a touch event having a strong force level, and haptic feedback according to haptic profile ID #3 (friction) is provided responsive to a touch even having a light force level.

Figure 13:
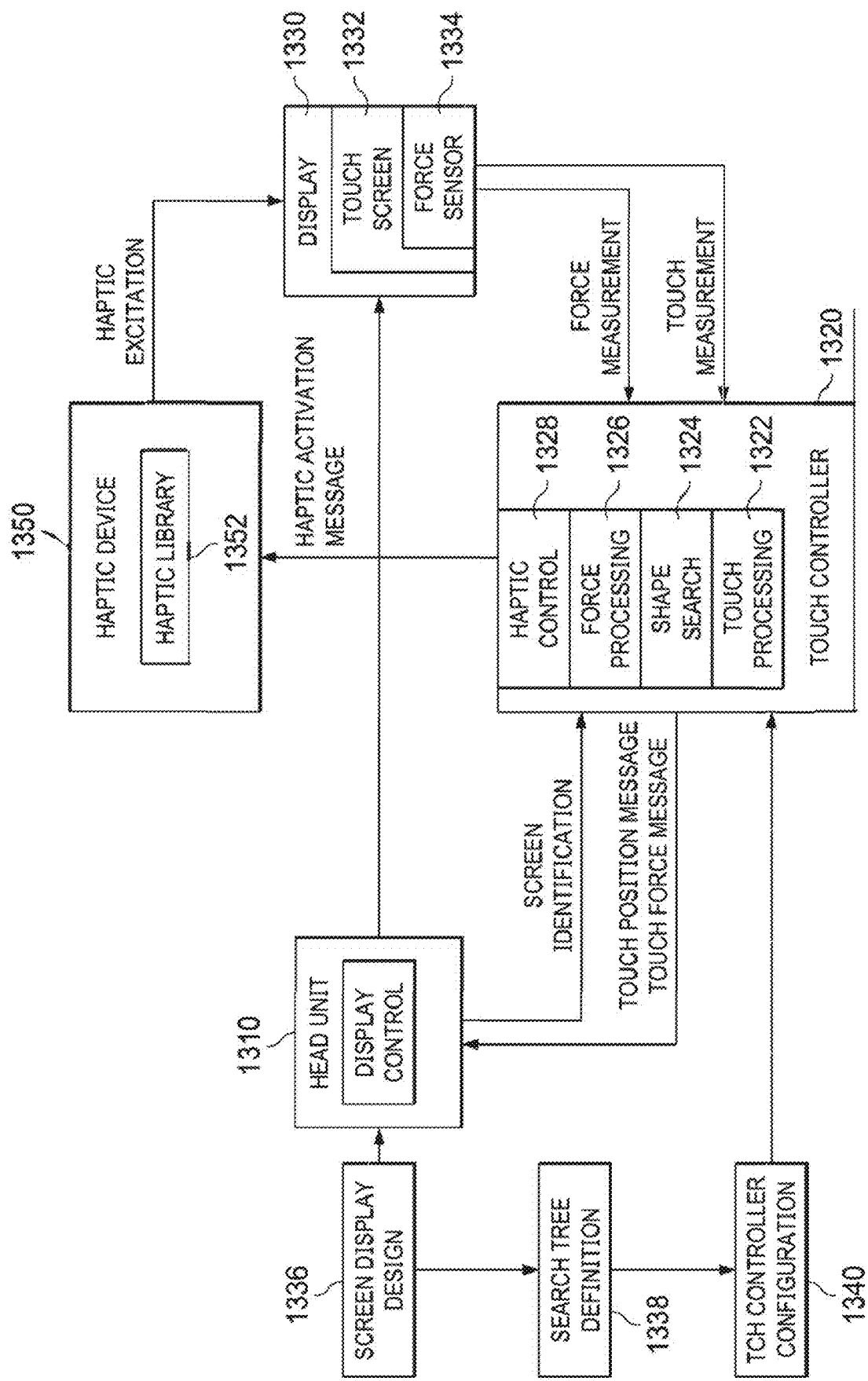
FIG. 13 illustrates an embodiment of the system of FIG. 11 incorporated into a head unit of an automobile as a sub-system.

FIG. 13 illustrates the system of FIG. 11 and GUI of FIG. 12 incorporated into automotive controls commanded by a head unit 1310, and haptic effects in the head unit 1310 are controlled by a microcontroller. In this embodiment the touch controller 1320 and UI element/shape search functions 1324 are part of an automotive subsystem where an automotive head unit 1310 responds to touches with haptic feedback without direct intervention of the Head Unit's processing circuitry. The touch controller 1320 is configured to identify touched screen buttons from the touch positions and force level information and run a touch state machine including button position to trigger the haptic effect.

In this embodiment, the force processing 1326 and touch processing 1322 are integrated into one controller component 1320, and the touch screen 1332 contains the definitions (screen display design 1336 and search tree definitions 1338) of a number of geometric object descriptions each required to elicit a range of haptic effects to be directly activated by the touch controller 1320 and performed by the haptic device 1350. The touch controller 1320 may also receive such definitions via a touch controller configuration unit 1340.

For example, after a touch at the display 1330, the touch controller 1320 receives force information and touch information from force processing 1326 and touch processing 1322. The information may include a force measurement from a force sensor 1334 and a touch position on the display. The UI element/shape search 1324 provides UI element information corresponding to the UI element, if any, displayed at the display 1330 where the touch occurred. If there is no UI element that corresponds to the location on the display, the UI element/shape search 1324 provides a null search result. While searching for a UI element's shape information, the UI element/shape search 1324 may use the definitions stored at the head unit 1310. In one embodiment, the UI element/shape search 1324 may receive the definitions during a provisioning process, for example, when the touch controller 1320 is integrated with the head unit 1310, or when the head unit 1310 is powered on.

If the UI element/shape search 1324 identifies a UI element, the haptic information is used by the haptic control 1328 to send a haptic activation message to the haptic device 1350 that includes a haptic effect and a position for the haptic effect. The haptic activation message may include a parameter indicative of the level of haptic effect (e.g., weak, medium, strong). The haptic device 1350 searches for the haptic effect definition in the haptic library 1352 stored at the haptic device. The haptic device 1350 then controls actuators at the display 1330 so that the specific area of the display exhibits the requested haptic effect. Notably, different haptic devices may have different haptic libraries so the effects may be different between devices.

In this embodiment, the GUI definition is an XAML file, which is an xml implementation for graphical user interfaces. The XAML file contains a hierarchical structured list of drawing instructions for the screen elements of the UIs of the GUI. In the XAML file there are tags associated with GUI elements. For example, "Width," "Height," and "Horizontal Alignment" are all valid tags for particular elements.

Virtual Widgets

As discussed above, in some embodiments, a contact-sensitive GUI (touch interface integrated with a GUI) may utilize virtual widgets, e.g., in combination with any of the features discussed above. As used herein, a "virtual widget" is any assemblage of shapes (e.g., including one or more active UI elements) included in a displayable GUI screen. For example, a virtual widget may comprise a defined assemblage of multiple instances and/or types of virtual buttons, sliders, knobs, dials, etc. As another example, a virtual widget may comprise a defined assemblage of active elements that collectively define an interface for controlling a defined function. For instance, a slider-type virtual widget or a rotatable dial-type virtual widget may consist of a defined collection of UI elements that relate to a range of positional selections for the slider or rotatable dial, e.g., as illustrated by the example rotatable dials shown in example FIG. 15, discussed below.

Virtual widgets may be displayed on the touchscreen, but in some embodiments exist only in the context of a touchscreen configuration module/process and on the touchscreen display. Virtual widgets may report to a head unit. The use of virtual widgets may reduce the physical interface complexity of the touch-sensitive GUI. For example, the use of virtual widgets may reduce overhead on the head unit to process touch positions, and may require no separate hardware or electronics for physical rotors, sliders, etc., e.g., for heating controls, radio controls, or any other type of controls.

Some embodiments provide systems and methods for defining, in a configurable manner, areas of a touchscreen (e.g., areas in a configured screen page) to be operated as virtual widgets (e.g., buttons, sliders, dials, etc.). When a touch is detected on the touchscreen, a touch controller may determine a position or state of the widget corresponding with the user touch (e.g., the linear position of a virtual slider or the rotational position of a virtual dial corresponding with the detected touch position), and report such position/state information in a "widget message" to the head unit instead of, or in addition to, reporting a "touch message" indicating the position of the touch on the touchscreen. Widget messages may indicate, for example, a user-selected position, rotation, 'touched' status, and/or number of detected touches on a respective widget, corresponding with the detected touch location, force, and/or other measurable aspect of the detected touch on the touchscreen.

In some embodiments, widget messages are communicated to the Head Unit in a separate stream from touch messages, e.g., in the example embodiment shown in FIG. 14, discussed below. In some embodiments, the touch controller suppresses sending touch messages to the head unit when a touch on a virtual widget is detected; in other words, touch messages may be suspended in favor of widget messages during touch interaction with a virtual widget.

The use of such virtual widgets allows virtual GUI controls to be positioned anywhere on the touchscreen, in a configurable and dynamic manner. In some embodiments, the virtual controls displayed on the screen may be changed and/or repositioned by changing the screen display ID, e.g., based on techniques disclosed above for UI shape searching.

Figure 14:
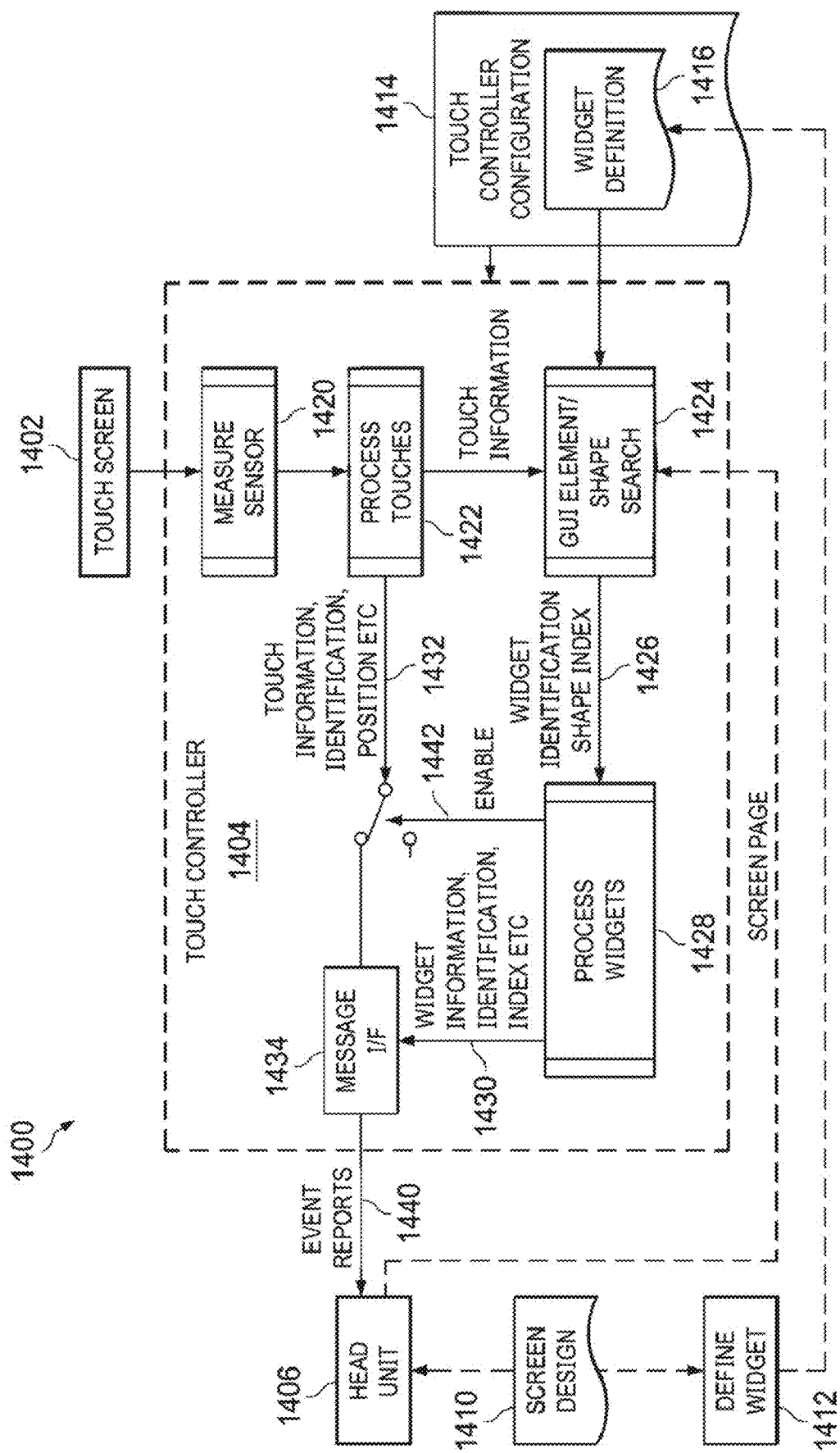
FIG. 14 illustrates an example touchscreen system that employs virtual widgets as disclosed herein, according to an example embodiment.

FIG. 14 illustrates an example GUI touchscreen system 1400 that employs virtual widgets as disclosed herein, according to one example embodiment. GUI touchscreen system 1400 may include a contact sensitive touchscreen 1402, a touch controller 1404, and a head unit 1406, each of which may provide any of the components (e.g., touch sensors, microcontroller, microcontroller firmware, processor, memory, haptic actuators, etc.) and provide any of the functionality provided by a touchscreen, touch controller, and head unit as discussed above. In some embodiments, touch controller 1404 may be embodied by firmware in a microcontroller.

System 1400 may also include a screen design module 1410 and a touch controller configuration module 1414. Screen design module 1410 may define or configure a screen design for each of one or more different screens (also referred to as pages) that may be selectively displayed at the touchscreen 1402. For each screen, screen design module

1410 may select virtual widgets to include in the screen, and the arrangement/layout of the selected widgets. Screen design module 1410 may communicate the screen design(s) to head unit 1406 for storage, and head unit 1406 may selectively provide screen designs to GUI element search engine 1424 as appropriate, e.g., based on screen currently selected for display (e.g., using a screen selection state machine provided by head unit 1406). Head unit 1406, or alternatively touch controller configuration module 1414, may then control the display on the touchscreen, e.g., by controlling which of multiple different screens is currently displayed, using various selections and/or arrangements of virtual widgets.

Screen design module 1410 may also define the parameters 1412 of each virtual widget included in any of the screen designs, and communicate respective widget definitions 1416 to the touch controller configuration module 1414, for storage. Touch controller configuration module 1414 may thus store a widget definition for each virtual widget, which may include a defined assemblage of related UI elements of one or multiple types. As shown, touch controller configuration module 1414 may provide GUI element search engine 1424 with the widget definitions included in the currently displayed screen, to allow GUI element search engine 1424 to detect a user interaction with a virtual widget based on a detected touch on the touchscreen.

As mentioned above, each virtual widget may comprise any assemblage of shapes displayed on the touchscreen. Each virtual widget may have a widget ID and a relative position on the screen. Virtual widgets may be further defined by parameters such as button number (for button-type widgets), rotor position/change (for rotor-type widgets), or slider position/change (for slider-type widgets), for example. Virtual widgets may also be defined by a shape configuration, which may be paged by the head unit, for example.

In operation, when a user touches/contacts the touchscreen 1402, sensing circuitry of touch controller 1404 may measure sensor signals at 1420 and generate one or more measurement signals in response to the measured contact at the touchscreen 1402. The contact measurement and processing 1420, 1422 may determine touch information (e.g., location, type, force, etc.) and provide it a GUI element search engine (or "shape search" module) 1424. GUI element search engine 1424 may then determine whether the touch location corresponds with a currently displayed virtual widgets, e.g., based on the widget location and shape parameters included in widget definitions 1416. This determination may employ any of the various techniques discussed above for UI element touch detection.

If GUI element search engine 1424 determines that touch location corresponds with a currently displayed virtual widget, search engine 1424 may communicate to a widget processing module 1428 widget information 1426 including the respective widget ID, a widget shape index, which UI element(s) within the widget is/are being touched, and/or other relevant information regarding the virtual widget being touched. At 1428, widget processing module 1428 may generate a widget message 1430 including any of the widget information 1426 received from GUI element search engine 1424 and/or widget definition information 1416 to a message interface 1434, which may forward an event report 1440 including the information from widget processing module 1428 to head unit 1406.

In some embodiments, widget processing module 1428 may generated an event report 1440 for each relevant widget touch event, which may include each widget touch event that triggers a haptic response or other user feedback or control function, e.g., as defined by widget definitions 1416 or other logic generated or otherwise accessible to head unit 1406 and/or touch controller 1404. For example, relevant widget touch events may include touch events on a widget that change a setting associated with the widget, e.g., by turning a respective function on/off, or increasing or decreasing an adjustable control parameter (e.g., volume, fan speed, display brightness, etc.), for example. Widget processing module 1428 may identify relevant widget touch events from widget information 1426 received from GUI element search engine 1424 and/or widget definition information 1416.

Head unit 1406 may thus receive widget-related event reports 1440 from widget processing module 1428 via message interface 1434, and respond to each event report 1440 by controlling aspects of the displayed screen at touchscreen 1402 and/or controlling at least one external system or device associated with the virtual widget being touched, e.g., a radio, infotainment system, map/guidance system, light, fan, motor, engine, etc. In some embodiments, head unit 1406 may control respective actuator(s) to provide a defined haptic feedback to the user at the location of the touch, e.g., as defined by widget definition information 1416. In other embodiments, haptic feedback via touchscreen 1402 may be controlled and provided by touch controller 1404 rather than head unit 1406, which may increase the response time for providing feedback to the user.

Further, as indicated at 1432 in FIG. 14, touch controller 1404 may be configured to forward all processed touch information to message interface 1434, which may generate and forward such information to head units 1406 via event reports 1440. In some embodiments, widget processing module 1428 may control an enable/disable switch/logic 1442 to disable or suspend the forwarding of this touch information 1432 when a virtual widget touch is identified by GUI element search engine 1424, e.g., during the generation and forwarding of widget messages 1430/widget-related event reports 1440 from widget processing module 1428 to head unit 1406.

Utilizing virtual widgets may simplify the required processing of the head unit 1406. For example, the use of virtual widgets may allow a single screen design to have multiple applications. For example, one interface may handle every product variant, via suitable configuration.

Figure 15:
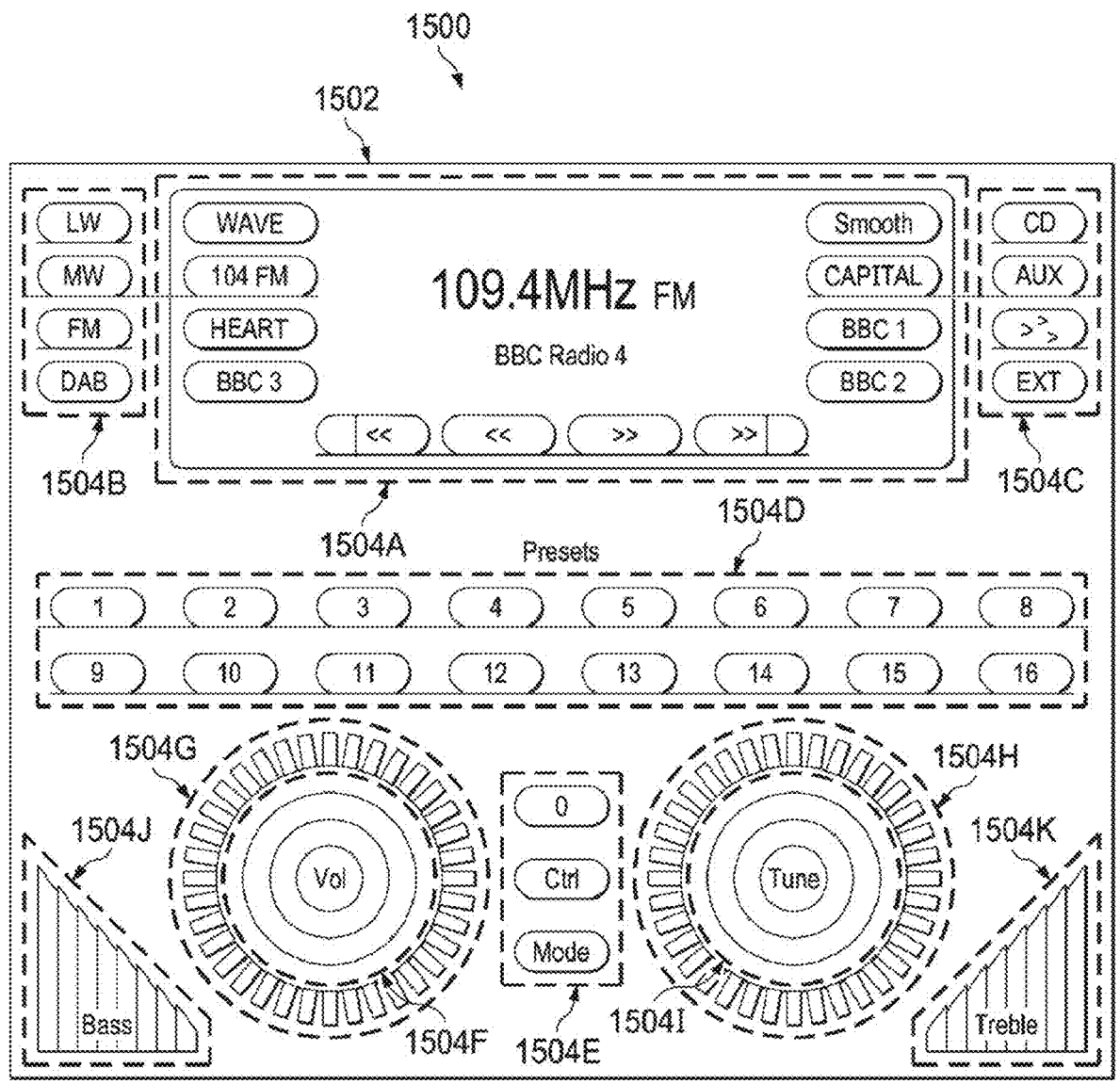
FIG. 15 illustrates an example radio touchscreen GUI including an arrangement of virtual widgets including various groups of UI elements, according to one example embodiment.

FIG. 15 illustrates an example radio screen (or page) 1502 displayed on a touchscreen GUI 1500, wherein the radio screen/page 1502 includes an arrangement of virtual widgets 1504 including various groups of UI elements, according to one example embodiment. Touchscreen GUI 1500 may be configured to selectively display any number and types of different screens/pages, to control a radio and/or one or more other systems or devices (e.g., an infotainment system, map/guidance system, light, fan, motor, engine, etc.).

In this example, the radio screen/page 1502 includes a variety of example virtual widgets 1504, including: a radio widget 1504A, a pair of radio mode widgets 1504B and 1504C, a channel presets widget 1504D, a state widget 1504E, a volume control activation widget 1504F and a volume adjustment widget 1504G, a tuner control activation widget 1504H and a tuner adjustment widget 1504I, a bass control widget 1504J, and a treble control widget 1504K.

The contact-sensitive GUIs (e.g., touchscreens) discussed above may be used in any suitable products or systems, e.g., household appliances or for automotive controls, for example. In some embodiments, the touchscreen control may be provided by firmware, e.g., embodied in a microcontroller, without requiring a discrete microprocessor/chip.

Because the GUI (e.g., touchscreen) may be defined and changed via configuration, the same GUI hardware may be used and selectively configured for multiple different purposes, and/or by multiple different users or customers. Further, the same GUI hardware may provide multiple different interface options across a product range. Conventional approaches typically provide separate controls and/or use the head unit to determine button presses or other contacts on the touchscreen, which fails to provide the flexibility of the disclosed system and may require additional processing resources or time.

The ability to define different characteristics and responses for different parts of the touchscreen is provided primarily by the UI element/shape search algorithm disclosed above, which allows for flexible definition of sensor areas. This is not a typical aspect of conventional touchscreen design. Further, the addition of separate messaging streams for UI elements/widgets allows functions such as a rotor and slider to be created virtually without the need for any physical device. The same functionality allows any shape to report as a virtual widget, with its own ID, bypassing the conventional touchscreen processing.

Static Widgets

Some embodiments may include static physical structures, e.g., physical ridges, bumps, grooves, etc., integrated in a touchscreen surface for providing tactile feedback to a person. Such structures are referred to herein as "static widgets." In some embodiments, static widgets may be used in combination with virtual widgets (discussed above), e.g., wherein a virtual widget is co-located with and may have a corresponding shape as a corresponding static widget physically integrated in the touchscreen surface. As discussed above, the virtual widget may report position, rotation, "touched" status, number of touches reported, etc. to an associated head unit.

Static widgets may provide a physical "feel" to corresponding virtual widgets or other UI elements displayed at the touchscreen. Thus, static widgets may allow a user to provide input at the touchscreen GUI by feel without looking at the touchscreen, which may be particularly useful in automotive applications or other applications in which the user's visual focus may be directed elsewhere. In some embodiments, the system is configured to report to the head unit a control position of a static widget being touched, as opposed to the position coordinates of the touch on the screen, as the system may provide special touch processing of the widget area.

A static widget may replace physical moving parts to increase the robustness of the system, as compared with conventional systems, and may reduce component count and inter-processor interfaces. In addition, multiple instances of one or more types or shapes of static widgets can be provided on a single screen. In some instances, static widgets may be used to replace one or more rotors (dials or knobs), sliders, buttons, switches, or any other types of physical interfaces.

Figure 16:
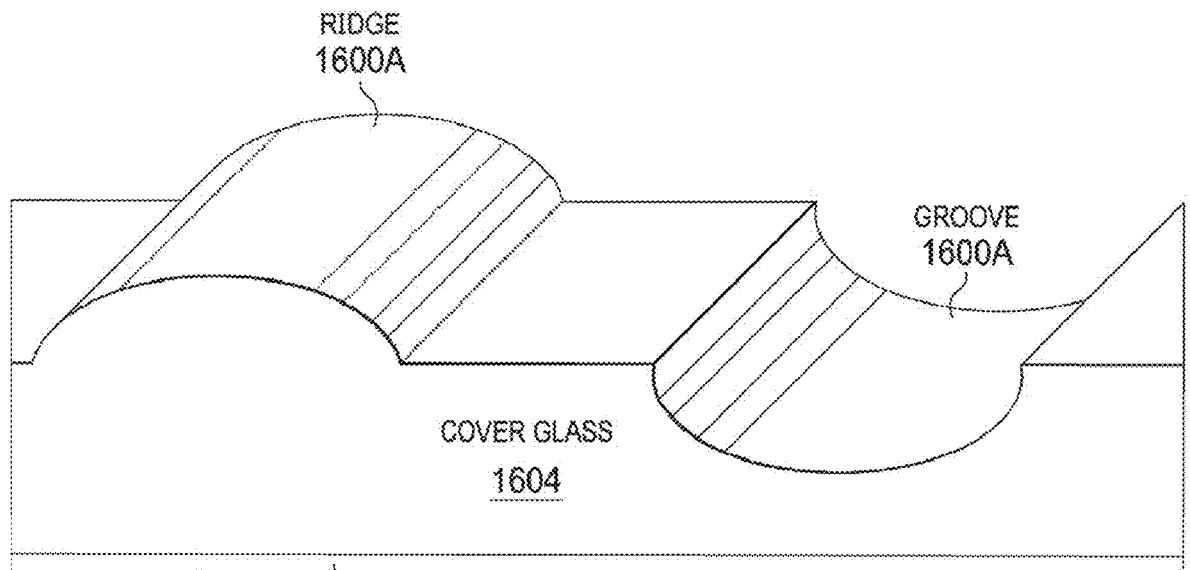
FIG. 16 illustrates an example of a static widget embodied as a ridge, and another static widget embodied as a groove, formed in the cover glass over a touch sensor, e.g., capacitive sensor, according to an example embodiment.

FIG. 16 illustrates two example static widgets 1600, in particular an example ridge-type static widget 1600A and an example groove-type static widget 1600A, both formed in a cover glass layer 1604 over a touch sensor 1608, e.g., capacitive sensor, according to an example embodiment.

In some embodiments, a head unit may control a display area corresponding with each static widget 1600 provided in the screen. For example, the head unit may dynamically control a virtual widget displayed at each static widget 1600, e.g., by dynamically calling particular virtual widgets by their corresponding widget IDs. Thus, for example, different virtual widgets may be selectively displayed at each respective static widget 1600. In some embodiments, different virtual widgets that are selectively displayable at a particular static widget 1600 may have the same shape, corresponding with the particular static widget 1600. As discussed above, the virtual widgets may be managed by a touchscreen controller.

Figure 17A:
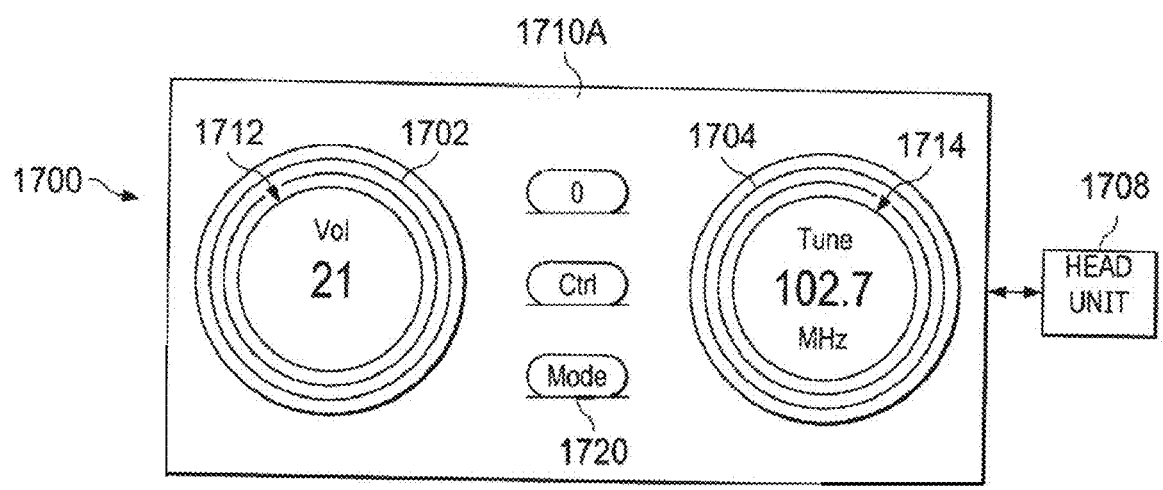
FIGS. 17A and 17B illustrate an example touchscreen including two static widgets embodied as circular grooves or ridges, according to an example embodiment.
Figure 17B:
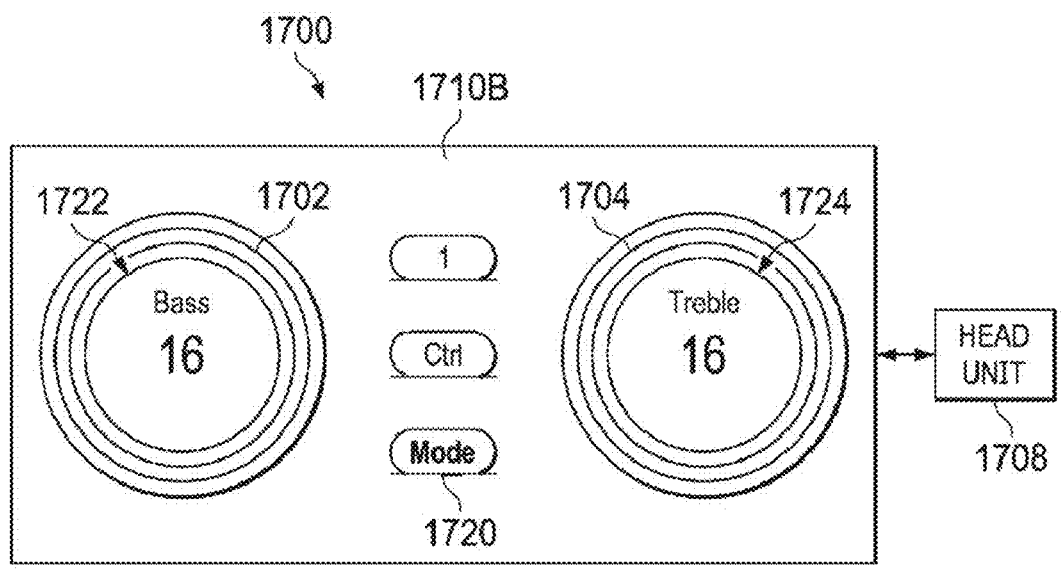

FIGS. 17A and 17B illustrate two views, in two different modes, of an example touchscreen 1700 including two static widgets 1702 and 1704, each embodied as a circular groove or ridge, according to an example embodiment. In FIG. 17A, a "Tuner Mode" is currently selected, wherein a head unit 1708 displays at touchscreen 1700 a first screen 1710A including a first pair of virtual widgets displayed at the locations of static widgets 1702 and 1704, namely a circular "Volume" virtual widget 1712 and a circular "Tune" virtual widget 1714, displayed at the locations of static widgets 1702 and 1704, respectively. When a user presses a "mode" button 1720, the head unit 1708 may call a second screen 1710B for a "Bass/Treble" mode, which may include a second pair of virtual widgets displayed at the locations of static widgets 1702 and 1704, namely a circular "Bass" virtual widget 1722 and a circular "Treble" virtual widget 1724, displayed at the locations of static widgets 1702 and 1704, respectively.

Figure 18:
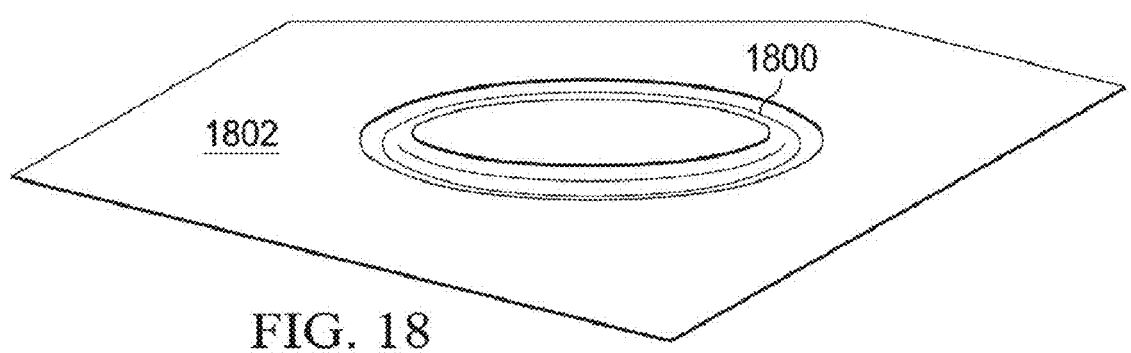
FIG. 18 illustrates a angled side view of a static widget of the example shown in FIGS. 17A and 17B, wherein the static widget is embodied as a circular groove.

FIG. 18 illustrates an angled side view of an example static widget 1800 embodied as a circular physical groove formed in a touchscreen cover (e.g., glass layer) 1802, according to one example embodiment.

With reference to FIG. 14 discussed above, a screen design module and/or a touch controller configuration module may derive a configuration/layout of each screen (or page) and/or virtual widgets or other UI elements within each screen/page based on screen geometry. The virtual widgets may exist under the physical structure of the screen, and thus under any static widgets, and may send widget messages to a head unit, as discussed above. In some embodiments, virtual widgets may generate complex touch reports, e.g., including gain and threshold issues, which may be performed separate from the head unit.

Embedded Static Widgets

Some embodiments may provide an enhancement to the static widgets discussed above, by forming the static widget structure from one or more different materials than the main body of the touchscreen cover. Thus, a static widget may be at least partially embedded in, or otherwise physically coupled to, the main body of the touchscreen cover, and thus may be referred to as an "embedded static widget." As discussed below, in some embodiments, the embedded static widget may be formed from a material having a higher dielectric constant than the main body of the touchscreen cover, e.g., to provide a constant touch capacitance across the ridge, or to provide an enhanced or reduced capacitance, depending on the desired performance.

As discussed above, a static widget may provide tactile feedback to a user, and may be embodied, for example, as a static ridge or groove in the screen, with no moving parts. Further, as discussed above, a co-located virtual widget may send widget messages to a head unit when a touch is detected, which widget messages may indicate a position, rotation, "touched" status, a number of touches reported, etc.

In addition, the use of embedded static widgets as disclosed above may enhance the detection of a finger of a user wearing a glove.

With some static widget designs, e.g., where a capacitive sensor is arranged below a ridge or groove in a cover glass, the touch signal may depend on the cover glass thickness and the touch size (area). If the cover glass is thin and the touch is flat, the touch-based capacitance may be defined or approximated by the following equation:

$$C = \frac{\epsilon_r \epsilon_o A}{t} \quad (1a)$$

According to Equation 1a, capacitance C of two equal-area parallel plates is the product of the area (A) of one plate, the thickness (t) separating the plates, and the dielectric constant ($\epsilon$) of the space separating the plates. The total dielectric constant, $\epsilon$, is the product of the dielectric constant of free space ($\epsilon_o$) and the relative dielectric constant of the material ($\epsilon_r$).

Alternatively, if the finger appears small and is far from the screen, given that the screen node has a fixed size, the touch-based capacitance may be approximated by the following equation:

$$C = k \frac{\epsilon_r \epsilon_o A}{t^2} \quad (1b)$$

In typical embodiments and situations, the true touch-based capacitance may fall between Equations 1a and 1b, which may be represented as $$\frac{\epsilon_r \epsilon_o A}{t} \leq C \leq k \frac{\epsilon_r \epsilon_o A}{t^2}.$$

Thus, if a ridge or other physical structure doubles the thickness t, capacitance C is reduced by a factor of between two and four, e.g., depending on whether Equation 1a or 1b is suitable for the particular situation. Thus, the system may provide additional touch processing to compensate for or address ridges, grooves, and other physical structures in the screen, e.g., to provide tactile feel to a user, without causing firmware complications related to touch detection, etc.

Thus, some embodiments may use a different material for ridges or other static widget structures than the base material of the touchscreen cover (e.g., glass or polymer). Further, virtual widgets may be employed to manage widget messaging, e.g., as discussed above.

Figure 19:
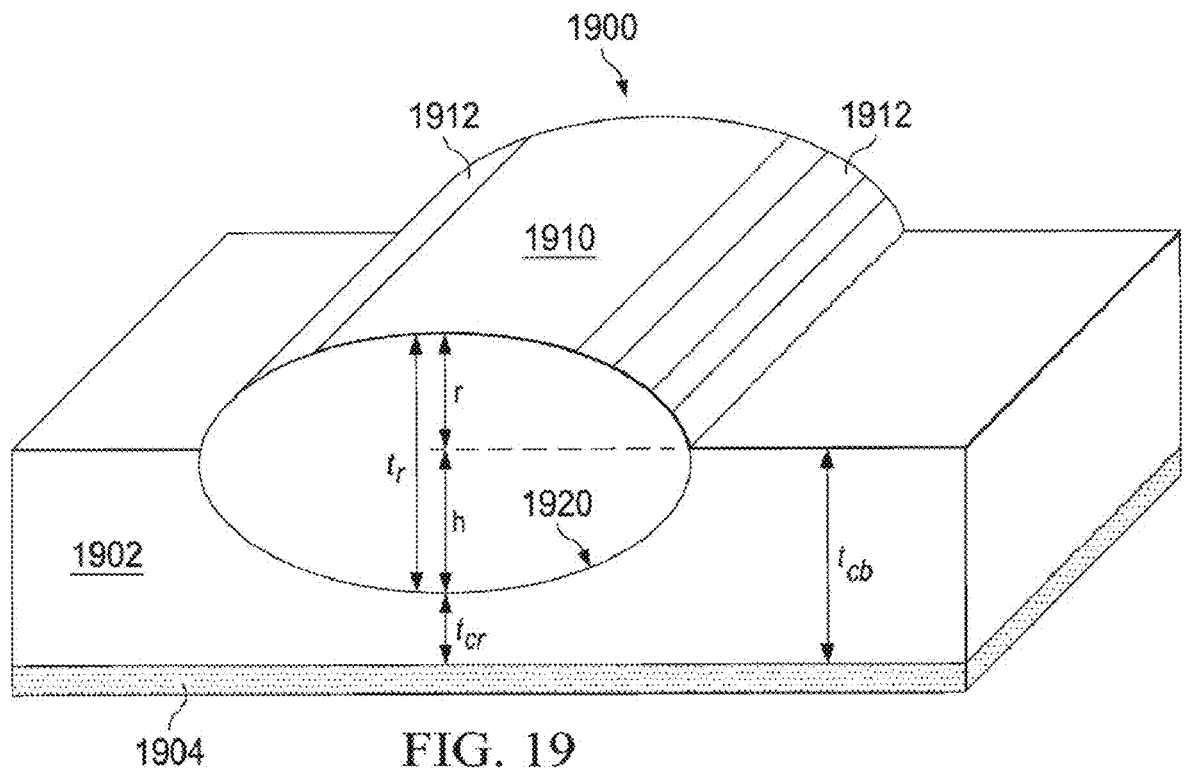
FIG. 19 illustrates an example structure of a ridge-type static widget formed in a touch screen, according to an example embodiment.

FIG. 19 illustrates an example structure of an example ridge-type static widget 1900 in a touchscreen cover 1902 arranged over a capacitive sensor 1904, according to one example embodiment. The ridge-type static widget 1900 may be embodied as an insert in formed in a groove 1920 formed in the touchscreen cover 1902.

According to Equations 1a and 1b above, the effect of a high dielectric constant $\epsilon_r$ is a change in the capacitive coupling.

For a situation in which the touch appears flat, based on Equation 1a, and with reference to the example structure shown in FIG. 19, wherein the base material of the touchscreen cover has a dielectric constant $\epsilon_{rc}$ and the ridge material has a dielectric constant $\epsilon_{rr}$, the average dielectric constant may be expressed as:

$$\epsilon_r \approx \frac{\epsilon_{rc} \epsilon_{rr}(t+r)}{\epsilon_{rc}(h+r) + \epsilon_{rr}(t-h)} \quad (2a)$$

which can be kept constant all over if:

$$\epsilon_{rr} \approx \frac{(h+r)^2 \epsilon_{rc}}{(2t-h)h} \quad (2b)$$

However if the touch response tends to Equation 1b:

$$C = k \frac{\epsilon_r \epsilon_o A}{t^2} (e.g.,$$

where the finger appears small and is far from the screen), the average dielectric constant may be expressed as:

$$\epsilon_r \approx \frac{\epsilon_{rc} \epsilon_{rr}}{(h+r)^2 \epsilon_{rc} + (t-h)^2 \epsilon_{rr}} \quad (3a)$$

which can be kept constant all over if:

$$\epsilon_{rr} \approx \frac{(h+r)^2 \epsilon_{rc}}{(2.t-h)h} \quad (3b)$$

Thus, the dielectric constant can be kept constant all over regardless of whether the touch appears flat (where Equation 1a applies) or not (where Equation 1b applies), The presence of different dielectric constants can be used to enhance or reduce the touch response in the region of the static widget, as desired, by selecting specific material(s) (having selected dielectric constant(s)) used in the ridge insert.

For example, the cover base material and ridge material of a ridge-type widget may be selected such that ridge material dielectric constant $\epsilon_{rr}$ is greater than or less than the cover base material dielectric constant $\epsilon_{rc}$. In some embodiments, a set of capacitance-related parameters including any of the screen cover material, ridge material, shape of the ridge, ridge height r, ridge depth h, ridge thickness (e.g., thickness $t_r$=h+r at the thickest point), baseline cover thickness $t_{cb}$, and/or reduced cover thickness $t_{cb}$ below the ridge may be collectively selected to provide an enhanced, neutral, or reduced capacitive touch detection sensitivity at one or more locations on the ridge, as compared with a reference area of the screen removed from the ridge (i.e., cover material with thickness t).

For example, any of all of the capacitance-related parameters may be selected to provide an enhanced capacitance or a reduced capacitance (as compared with the reference area) at all points/areas on the ridge. As another example, any of all of the capacitance-related parameters may be selected to provide an enhanced capacitance at selected points/areas on the ridge, but a neutral or reduced capacitance at other points/areas on the ridge, or vice versa. For instance, referring to FIG. 19, the cover material, baseline cover thickness $t_{br}$, reduced cover thickness $t_{cr}$ ridge material, ridge shape, and ridge thickness $t_r$ may be selected to provide an enhanced capacitance at a central point or area of the ridge, indicated at 1910, but a neutral or reduced capacitance near the lateral edges of the ridge, indicated at 1912.

In one example embodiment, the example ridge-type static widget 1900 shown in FIG. 19 may be formed from material(s) having a higher dielectric constant than the screen cover 1902, to provide a constant or substantially constant touch capacitance across the ridge 1900.

In one embodiment, a ridge-type static widget, e.g., defining a rotor, may have a varying angular dielectric constant, so that in some locations the touch appears larger (high dielectric constant) and in other locations the touch appears smaller (low dielectric constant), to thereby enhance the discrimination between different widget locations.

In one example embodiment, touchscreen cover 1902 is formed from a polymer having a dielectric constant $\in_{rc}$=3.5, and a ridge insert formed from glass having a dielectric constant $\in_{rr}$ of about 8 (e.g., between 7 and 8.5). For example, a ridge insert may be formed form a strengthened glass, e.g., Gorilla® Glass by Corning® or any similar glass product having a dielectric constant of between 7 and 8.5 (e.g., 7.75) at relevant processing speeds.

Further, in some embodiments, a static widget may include multiple layers, sections or regions formed from multiple different materials, e.g., having different dielectric constants, to control the overall touch-sensitive response of the static widget. For example, a static widget may be formed over, inserted in, or otherwise secured to a base cover layer (e.g., formed from glass or polymer) and may include a central or main region formed from a first material having a first dielectric constant, and one or more secondary regions formed from a second material having a second dielectric constant different from (greater than or less than) the first dielectric constant, wherein each of the first and second dielectric constants may be the same as the base cover layer material.

Figure 20:
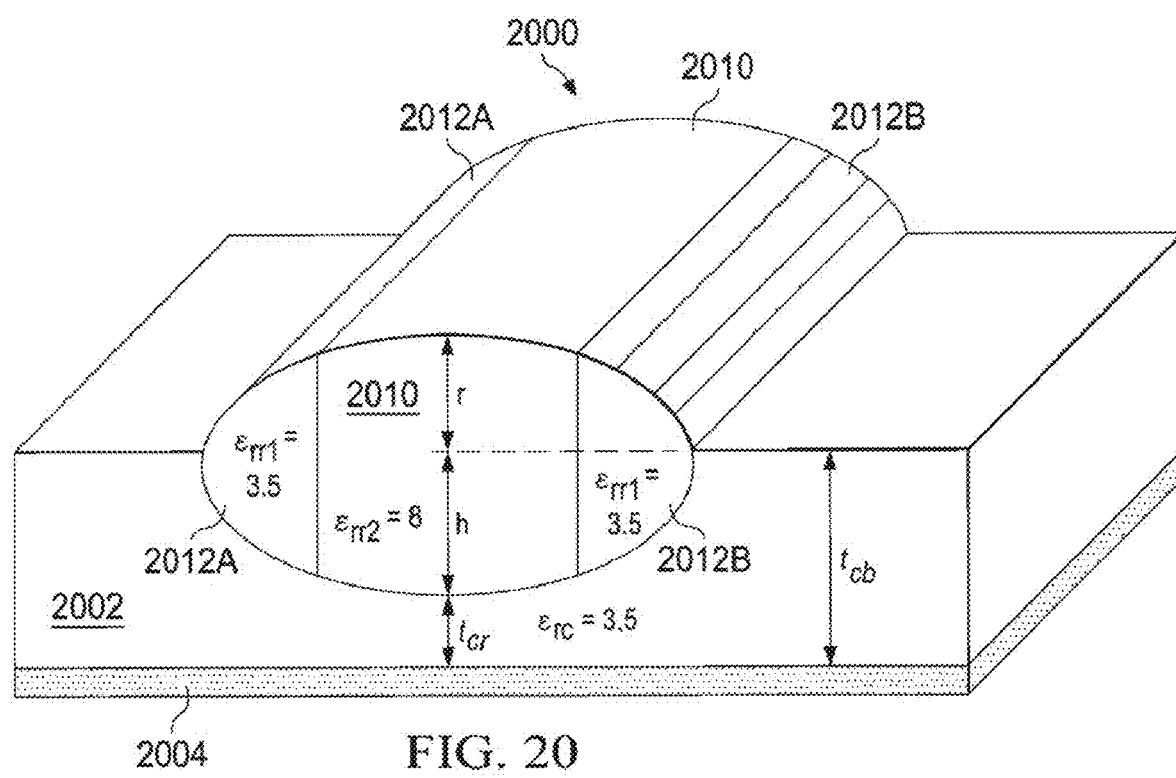
FIG. 20 illustrates an example structure of a multi-component ridge-type static widget formed in a touch screen, according to an example embodiment.

FIG. 20 illustrates an example ridge-type static widget 2000 in a touchscreen cover 2002 arranged over a capacitive sensor 2004, according to one example embodiment. Ridge-type static widget 2000 may be generally similar to ridge-type static widget 1900 shown in FIG. 19 and discussed above, but may be formed as a multi-component insert including a central ridge component or region 2010 formed between a pair of edge ridge components or regions 2012A and 2012B. The central ridge component or region 2010 may be formed from a first material having a first dielectric constant, while the edge ridge components or regions 2012A and 2012B may be formed from a second material having a second dielectric constant different from (greater than or less than) the first dielectric constant. Each of the first and second materials may be the same as or different than the material of the base cover layer 2002. Further, each of the first and second dielectric constants of the first and second materials may be the same as or different from (greater than or less than) the dielectric constants of the base cover layer material.

In the example embodiment shown in FIG. 20, the touchscreen cover layer 2002 is formed from a polymer having a dielectric constant $\in_{rc}$=3.5, and ridge-type static widget 2000 is formed as a multi-component insert including (a) a central ridge component 2010 formed from strengthened glass (e.g., Gorilla® Glass by Corning® or any similar glass product as discussed above having a dielectric constant $\in_{rr}2$=about 8 (e.g., between 7 and 8.5), formed between (b) a pair of lateral side regions 2012A and 2012B formed from the same polymer as the base cover layer 2002 and thus having a dielectric constant $\in_{rr1}$=3.5.

In other embodiments, a multi-component static widget may be formed with multiple layers or components arranged vertically with respect to each other (e.g., in a stack formation) as opposed to the laterally as in the examples shown in FIGS. 19 and 20.

Many of the functional units described in this specification may be illustrated, described or labeled as modules, threads, or other segregations of programming code, in order to more particularly emphasize their implementation independence. Modules may be at least partially implemented in hardware, in one form or another. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented using software or firmware, stored on a physical storage device (e.g., a computer readable storage medium), in memory, or a combination thereof for execution by various types of processors.

An identified module of executable code may, for instance, comprise one or more physical or logical blocks of computer instructions, which may, for instance, be organized as a thread, object, procedure, or function. Nevertheless, the executable of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several storage or memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more physical devices, which are referred to herein as computer readable media.

In some embodiments, the software portions are stored in a non-transitory state such that the software portions, or representations thereof, persist in the same physical location for a period of time. Additionally, in some embodiments, the software portions are stored on one or more non-transitory storage devices, which include hardware elements capable of storing non-transitory states and/or signals representative of the software portions, even though other portions of the non-transitory storage devices may be capable of altering and/or transmitting the signals. Examples of non-transitory storage devices are flash memory and random-access memory (RAM). Another example of a non-transitory storage device includes a read-only memory (ROM) which can store signals and/or states representative of the software portions for a period of time. However, the ability to store the signals and/or states is not diminished by further functionality of transmitting signals that are the same as or representative of the stored signals and/or states. For example, a processor may access the ROM to obtain signals that are representative of the stored signals and/or states in order to execute the corresponding software instructions.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventors.

The invention claimed is:

1. A user interface system, comprising: a touchscreen cover layer having an upper surface;
  a tactile structure formed in or coupled to the touchscreen cover layer, the tactile structure comprising a raised structure extending upwardly from the upper surface of the touchscreen cover layer or a depressed structure extending downwardly from the upper surface of the touchscreen cover layer, and having an upper surface non-planar with the upper surface of the touchscreen cover layer and defining a surface texture that provides tactile feedback to a user's finger;
  wherein both the upper surface of the touchscreen cover layer and the upper surface of the tactile structure are outer surfaces touchable by the user's finger;
  wherein the touchscreen cover layer is formed from a first material having a first dielectric constant and the tactile structure is formed from at least one second material having a different dielectric constant than the first dielectric constant of the first material of the touchscreen cover layer;
  a touchscreen display device arranged under the touchscreen cover and configured to display a configurable graphical user interface (GUI) including a respective virtual user interface element at a location corresponding with the tactile structure; and
  a processor configured to sense a touch at a location of a particular virtual user interface element, identify the particular virtual user interface element, and initiate an action associated with the virtual user interface element.

2. The user interface system of claim 1, wherein the processor is embodied in a microcontroller.

3. The user interface system of claim 1, wherein:
  the touchscreen cover layer is formed from a first material having a first dielectric constant; and
  the tactile structure is formed from at least one second material having a higher dielectric constant than the first dielectric constant of the first material of the touchscreen cover layer.

4. The user interface system of claim 1, wherein:
  the touchscreen cover layer is formed from a first material having a first dielectric constant; and
  the tactile structure is formed from at least one second material having a lower dielectric constant than the first dielectric constant of the first material of the touchscreen cover layer.

5. The user interface system of claim 1, wherein the tactile structure formed in or coupled to the touchscreen cover layer is formed from at least one two different materials having different dielectric constants.

6. The user interface system of claim 1, wherein the tactile structure comprises a raised ridge or a depressed groove.

7. A touchscreen system, comprising:
  a touchscreen cover layer having an upper surface, the touchscreen cover layer formed from a first material having a dielectric constant; and
  a tactile structure coupled to the touchscreen cover layer, the tactile structure comprising a raised structure extending upwardly from the upper surface of the touchscreen cover layer or a depressed structure extending downwardly from the upper surface of the touchscreen cover layer, and having an upper surface non-planar with the upper surface of the touchscreen cover layer to define a non-planar surface texture, wherein the tactile structure is formed from at least one second material having a different dielectric constant than the first material of the touchscreen cover layers
  wherein both the upper surface of the touchscreen cover layer and the upper surface of the tactile structure are outer surfaces touchable by a user's finger.

8. The touchscreen system of claim 7, further comprising a capacitivesensor arranged under the touchscreen cover layer and configured to detect touches on the tactile structure and touches on other areas of the touchscreen cover layer.

9. The touchscreen system of claim 7, further comprising a touchscreen display element under the touchscreen cover layer and configured to display a graphical user interface including a virtual user interface element at a location corresponding with the tactile structure.

10. The touchscreen system of claim 7, further comprising a touchscreen display element under the touchscreen cover layer and configured to display a graphical user interface including a virtual widget at a location corresponding with the tactile structure.

11. The touchscreen system of claim 7, wherein the tactile structure is formed from at least one second material having a higher dielectric constant than the first material of the touchscreen cover layer.

12. The touchscreen system of claim 7, wherein the tactile structure is formed from at least one two different materials having different dielectric constants.

13. The touchscreen system of claim 7, wherein the tactile structure defines a ridge or bump.

14. The touchscreen system of claim 7, wherein the tactile structure comprises a raised ridge or a depressed groove.

15. A user interface system, comprising:
  a touchscreen cover layer having an upper surface, the touchscreen cover layer formed from a first material having a first dielectric constant;
  a tactile structure coupled to the touchscreen cover layer, the tactile structure comprising a raised structure extending upwardly from the upper surface of the touchscreen cover layer or a depressed structure extending downwardly from the upper surface of the touchscreen cover layer, and having an upper surface non-planar with the upper surface of the touchscreen cover layer to define a non-planar surface texture, wherein both the upper surface of the touchscreen cover layer and the upper surface of the tactile structure are outer surfaces touchable by a user's finger, and wherein the tactile structure is formed from at least one second material having a different dielectric constant than the first dielectric constant of the first material of the touchscreen cover layer;
  touchscreen display element under the touchscreen cover layer and configured to display a graphical user interface (GUI) including a virtual user interface element at a location corresponding with the tactile structure; and
  a processor configured to identify a touch at a location of the virtual user interface element, identify the virtual user interface element, and initiate an action associated with the virtual user interface element.

16. The user interface system of claim 15, wherein the processor is embodied in a microcontroller.

17. The user interface system of claim 15, wherein the tactile structure comprises a raised ridge or a depressed groove.

* * * * *